Figure 1:
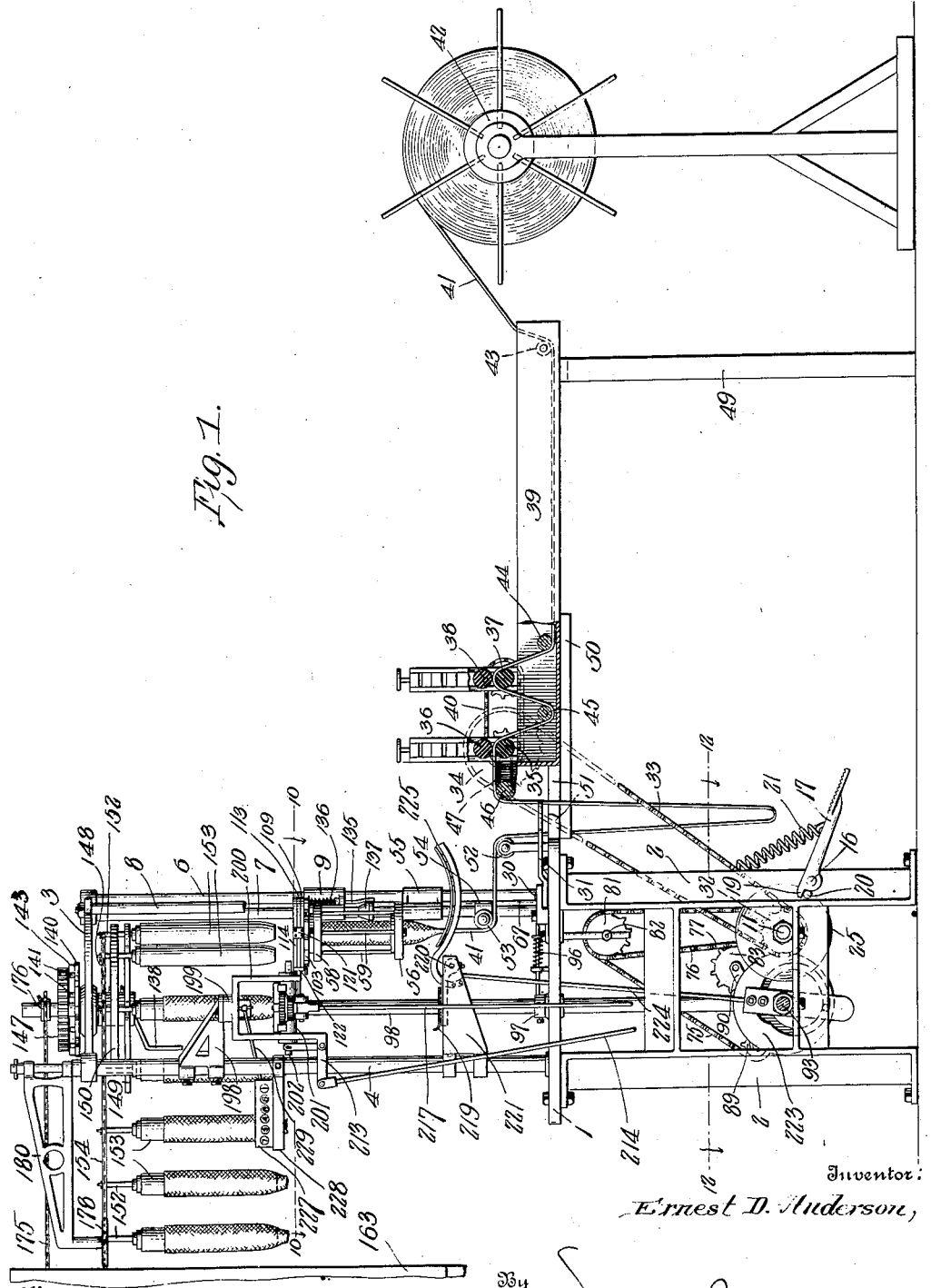

No. 844,644. PATENTED FEB. 19, 1907.
E. D. ANDERSON.
MANTLE IMPREGNATING MACHINE.
APPLICATION FILED JULY 16, 1906.

15 SHEETS—SHEET 1.

Witnesses
A.W. Holmes

Inventor:
Ernest D. Anderson,
By Dodge and Sons,
Attorneys

No. 844,644.

PATENTED FEB. 19, 1907.

E. D. ANDERSON.
MANTLE IMPREGNATING MACHINE.
APPLICATION FILED JULY 16, 1906.

15 SHEETS—SHEET 3.

Witnesses

Inventor:
Ernest D. Anderson,
By Dodge and Sons,
Attorneys

No. 844,644. PATENTED FEB. 19, 1907.
E. D. ANDERSON.
MANTLE IMPREGNATING MACHINE.
APPLICATION FILED JULY 16, 1906.

15 SHEETS—SHEET 4.

Witnesses
Inventor: Ernest D. Anderson,
By Dodge and Sons, Attorneys

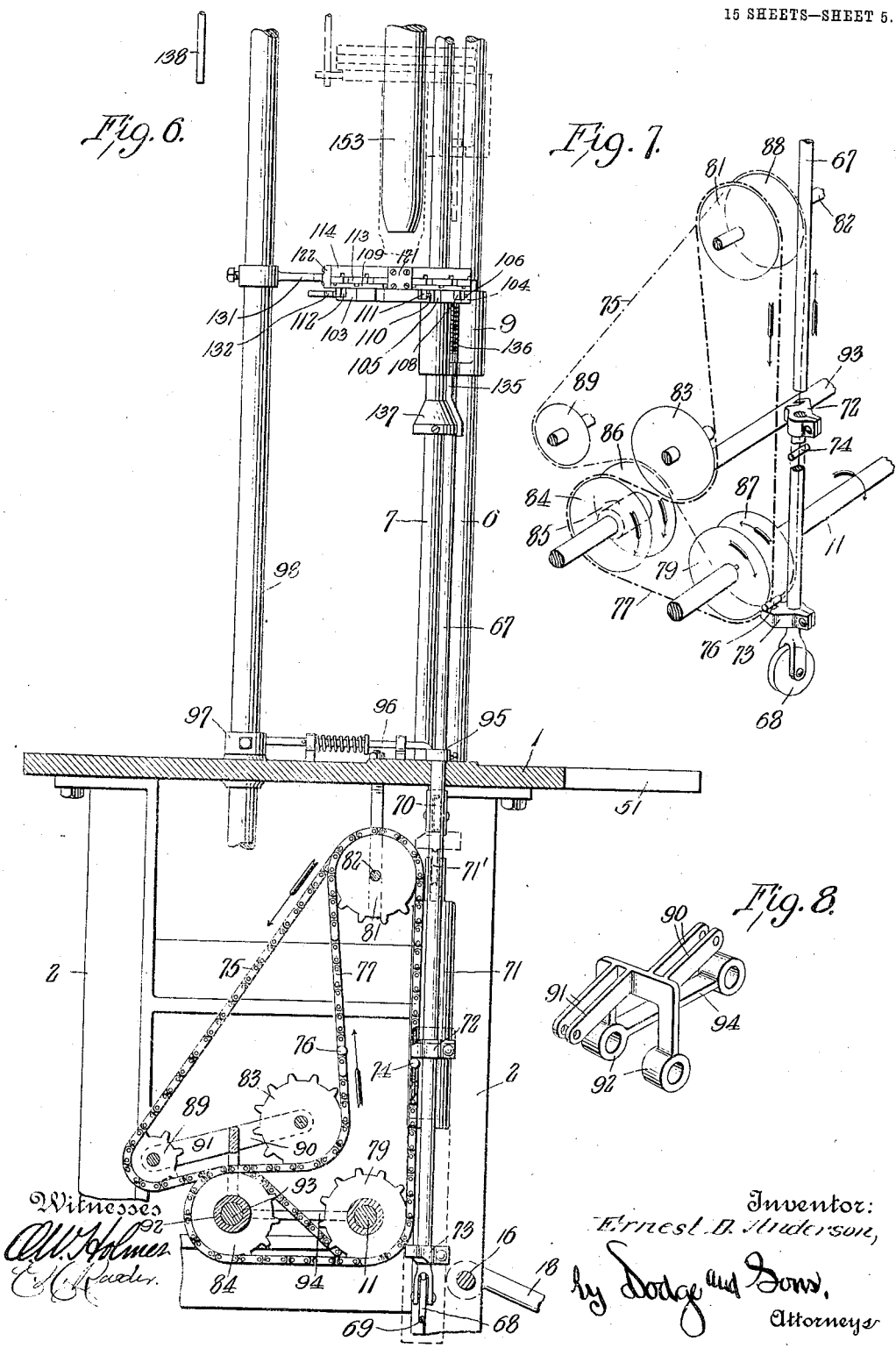

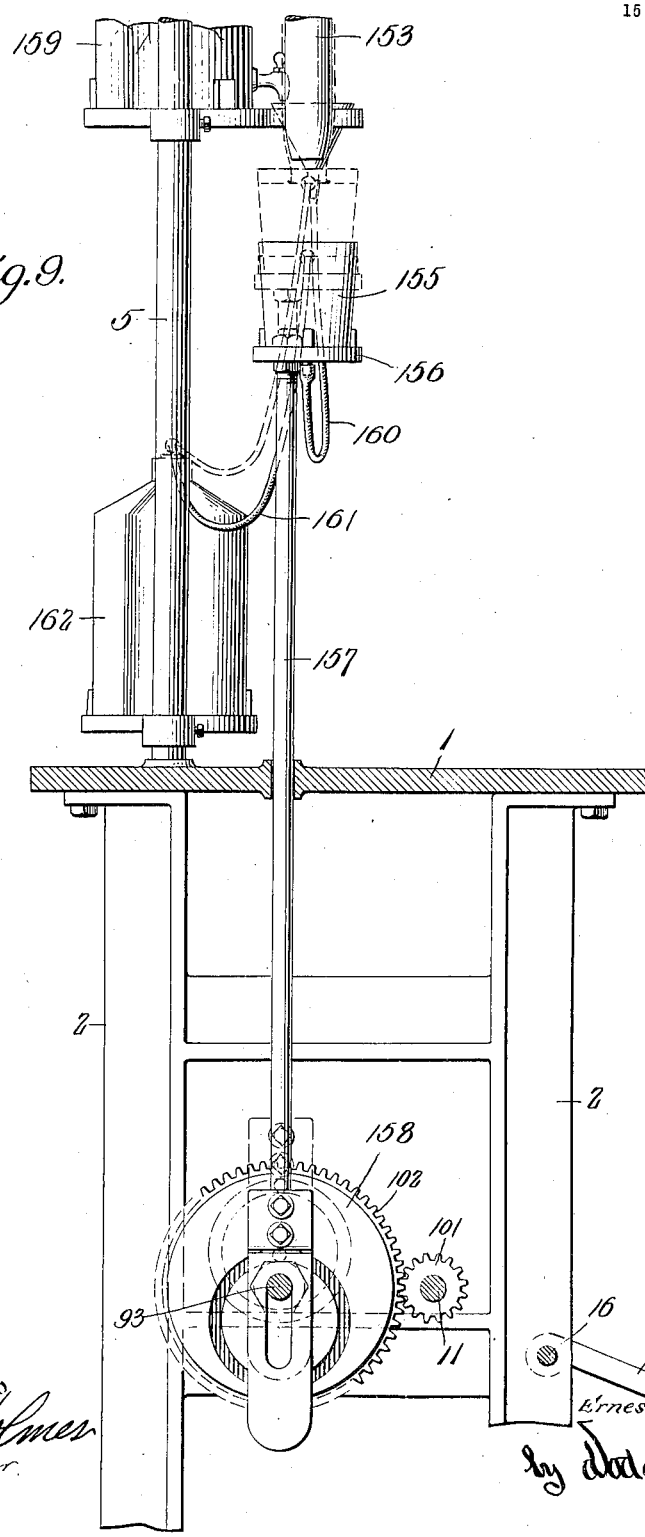

No. 844,644. PATENTED FEB. 19, 1907.
E. D. ANDERSON.
MANTLE IMPREGNATING MACHINE.
APPLICATION FILED JULY 16, 1906.

15 SHEETS—SHEET 7.

Witnesses
Inventor:
Ernest D. Anderson,
by Dodge and Sons,
Attorneys

No. 844,644. PATENTED FEB. 19, 1907.
E. D. ANDERSON.
MANTLE IMPREGNATING MACHINE.
APPLICATION FILED JULY 16, 1906.
15 SHEETS—SHEET 8.

Witnesses
Inventor:
Ernest D. Anderson,
by Dodge and Sons.
Attorneys

No. 844,644. PATENTED FEB. 19, 1907.
E. D. ANDERSON.
MANTLE IMPREGNATING MACHINE.
APPLICATION FILED JULY 16, 1906.
15 SHEETS—SHEET 10.
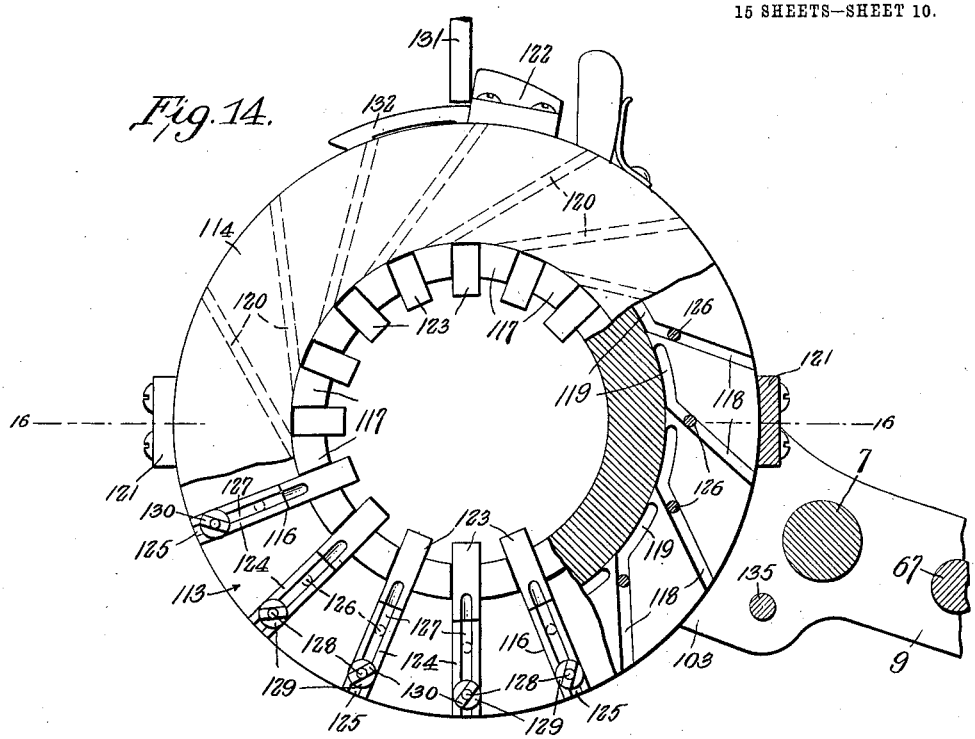
Fig. 14.
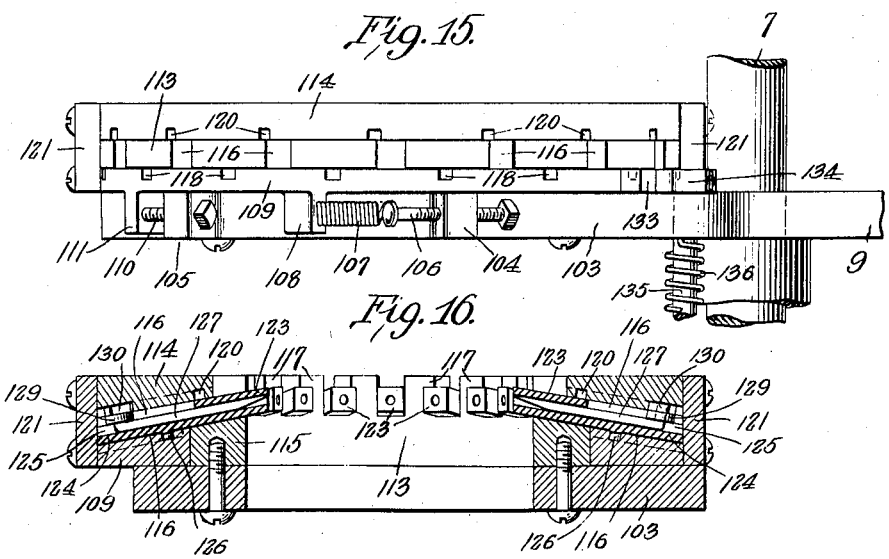
Fig. 15.
Fig. 16.
Witnesses
C. W. Holmes
C. H. Raider
Inventor:
Ernest D. Anderson,
by Dodge and Sons,
Attorneys No. 844,644.  
PATENTED FEB. 19, 1907.  
E. D. ANDERSON.  
MANTLE IMPREGNATING MACHINE.  
APPLICATION FILED JULY 16, 1906.  
15 SHEETS—SHEET 11.

Witnesses  
Inventor: Ernest D. Anderson,  
by Dodge and Sons,  
Attorneys

No. 844,644. PATENTED FEB. 19, 1907.
E. D. ANDERSON.
MANTLE IMPREGNATING MACHINE.
APPLICATION FILED JULY 16, 1906.
15 SHEETS—SHEET 12.
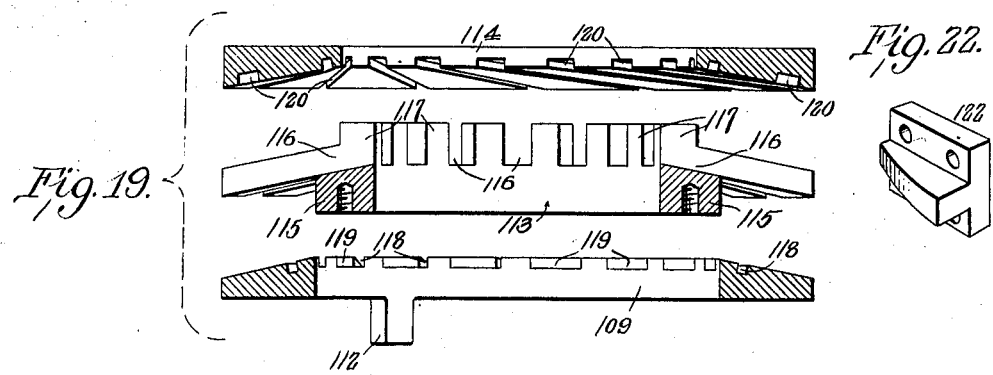
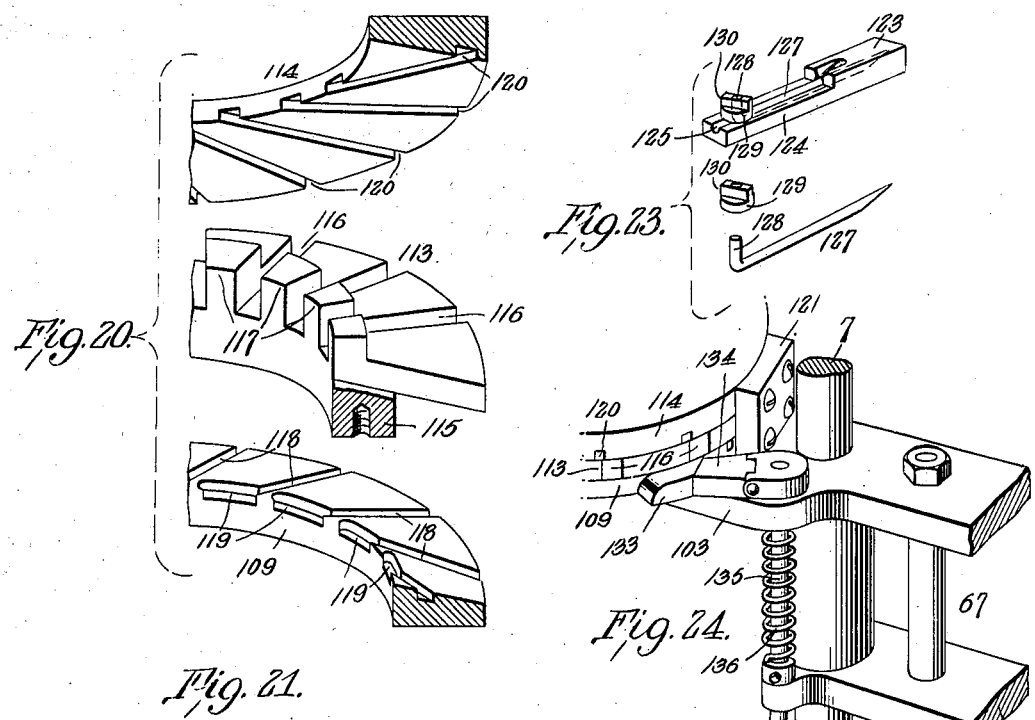
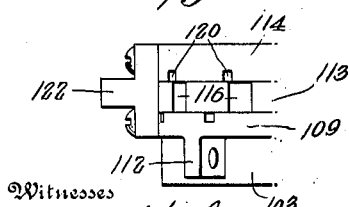
Inventor:
Ernest D. Anderson,
By Dodge and Sons,
Attorneys No. 844,644. PATENTED FEB. 19, 1907.
E. D. ANDERSON.
MANTLE IMPREGNATING MACHINE.
APPLICATION FILED JULY 16, 1906.
15 SHEETS—SHEET 13.
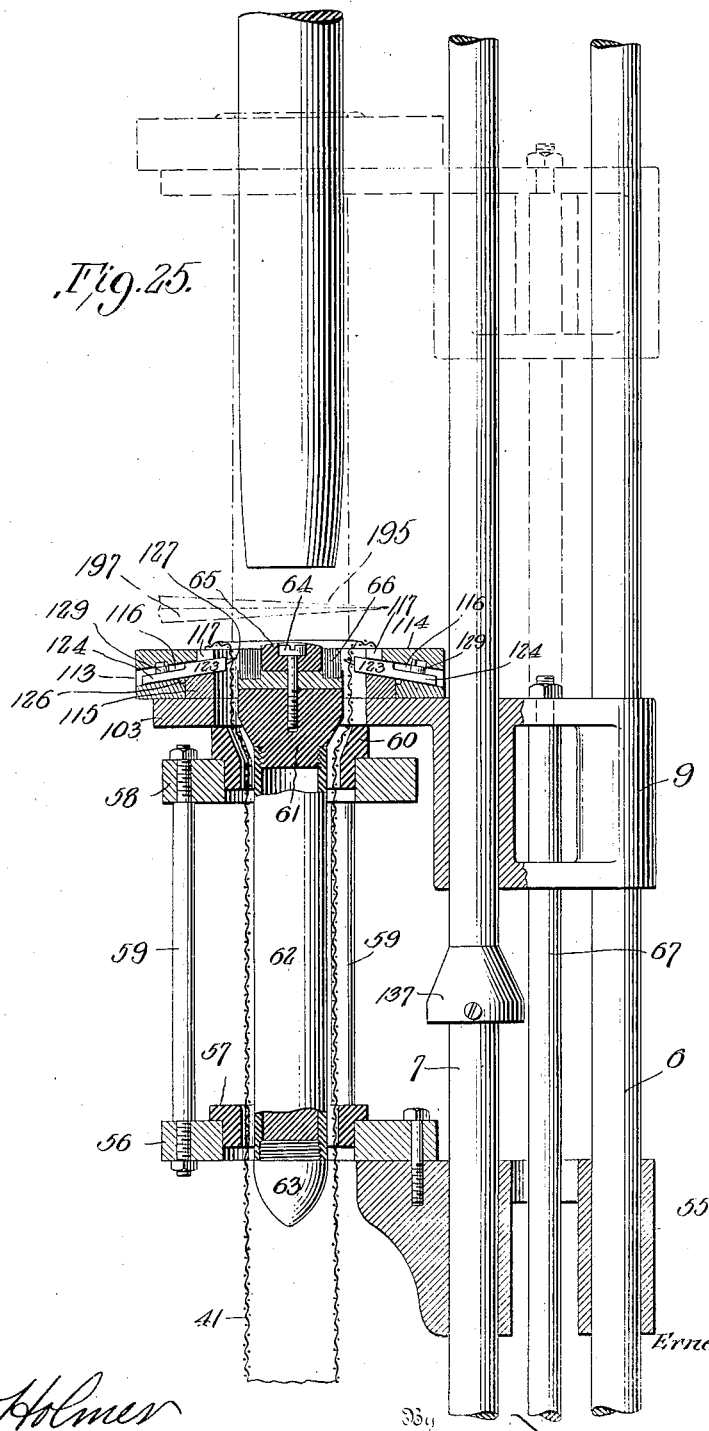

No. 844,644. PATENTED FEB. 19, 1907.
E. D. ANDERSON.
MANTLE IMPREGNATING MACHINE.
APPLICATION FILED JULY 16, 1906.

15 SHEETS—SHEET 14.

Witnesses
A. W. Holmes

Inventor:
Ernest D. Anderson,
by Dodge and Sons,
Attorneys

No. 844,644. PATENTED FEB. 19, 1907.
E. D. ANDERSON.
MANTLE IMPREGNATING MACHINE.
APPLICATION FILED JULY 16, 1906.
15 SHEETS—SHEET 15.
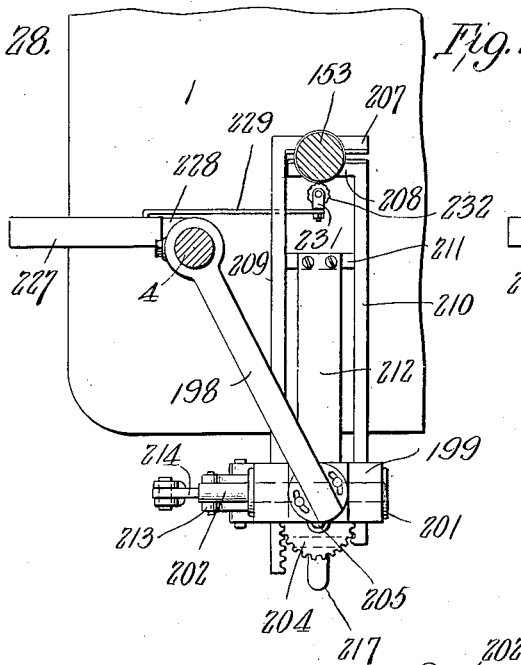
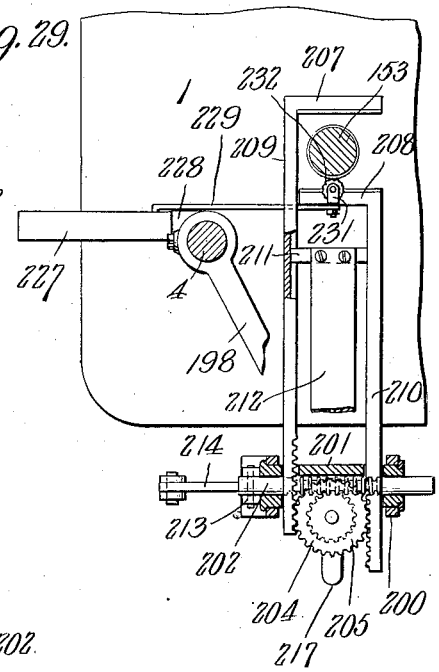
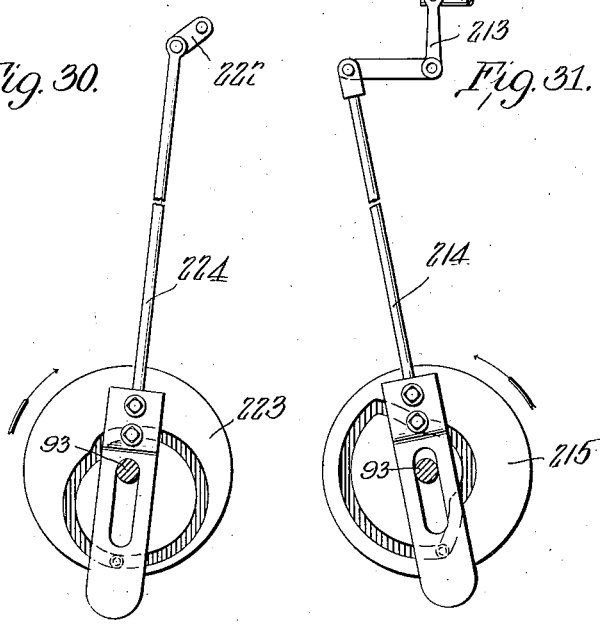
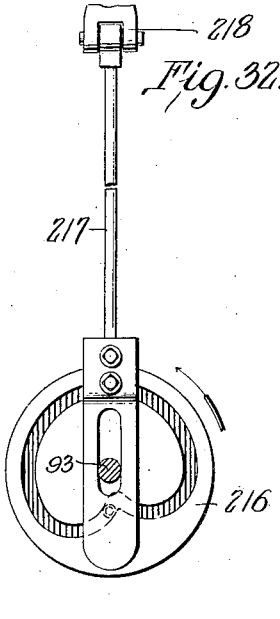
Witnesses
C. W. Holmes
C. H. Raeder
Inventor:
Ernest D. Anderson,
by Dodge and Sons,
Attorneys

UNITED STATES PATENT OFFICE.

ERNEST D. ANDERSON, OF NEW YORK, N. Y., ASSIGNOR TO THOMAS ADAMS, JR., OF NEW YORK, N. Y.

MANTLE-IMPREGNATING MACHINE.

No. 844,644.      Specification of Letters Patent.      Patented Feb. 19, 1907.

Application filed July 16, 1906. Serial No. 326,476.

*To all whom it may concern:*

Be it known that I, ERNEST D. ANDERSON, a citizen of the United States, residing at New York city, in the county of New York and State of New York, have invented certain new and useful Improvements in Mantle-Impregnating Machines, of which the following is a specification.

My present invention relates to improvements in mantle-impregnating machines, the details of which will be hereinafter set forth. The main object of the invention is to produce a machine which will thoroughly and accurately impregnate a mantle-forming web, pass the web thus impregnated successively onto a series of forms or holders, the web being severed when the requisite length has been passed onto each form or holder, subject one end of the mantle-web thus supported to a "head solution," dry the mantles on the forms, and thereafter strip the mantles from the forms and place the dried mantles in or upon a suitable holder.

A further object of the invention is to provide automatic means acting in conjunction with the stripping mechanism for registering the number of mantles which have been passed through the machine, the arrangement being such that the register is inoperative when the machine is running idle.

The advantages which result from the construction above outlined and others incident to the construction and operation of other features not hereinbefore specifically mentioned will be set forth in the following detail description, reference being had to the annexed drawings, wherein—

Figure 2:
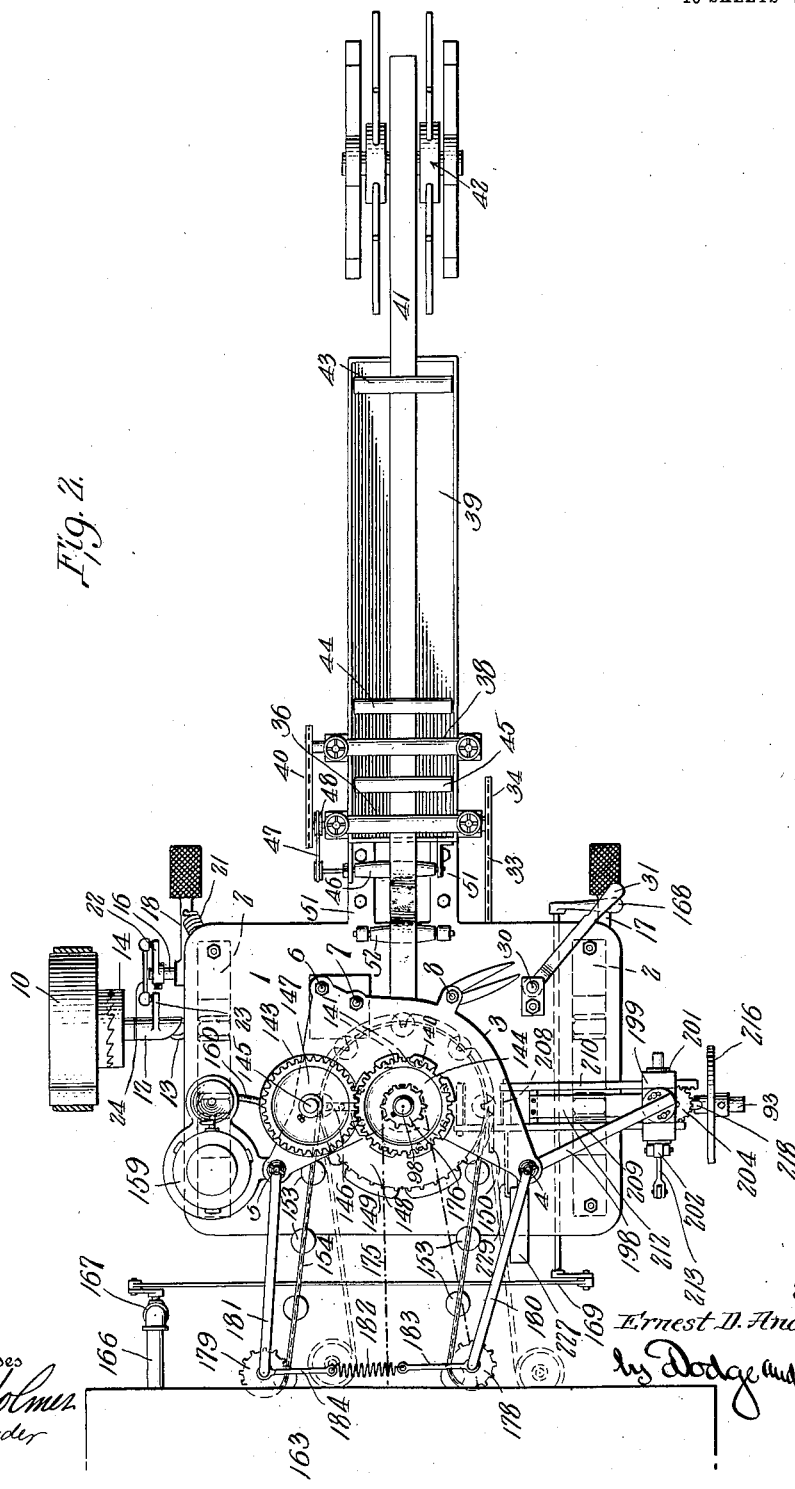
Figure 3:
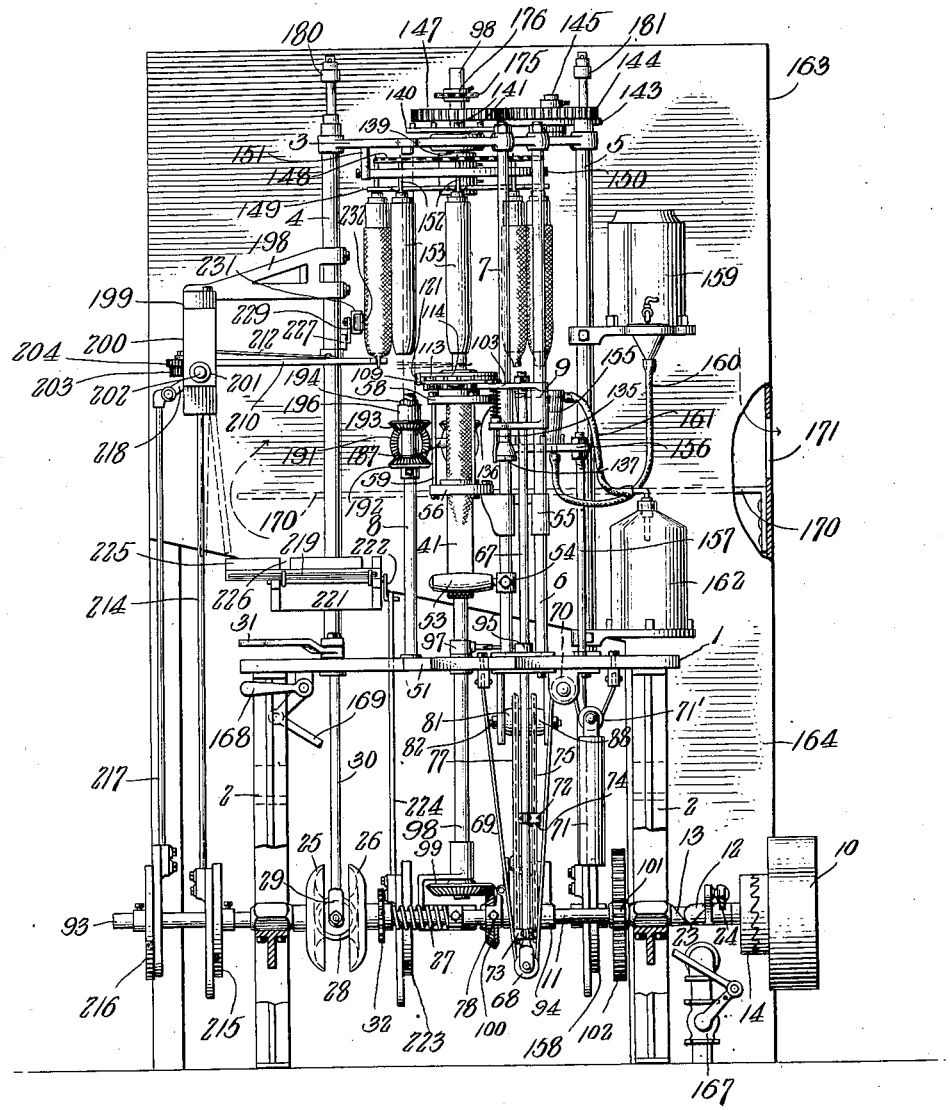
Figure 4:
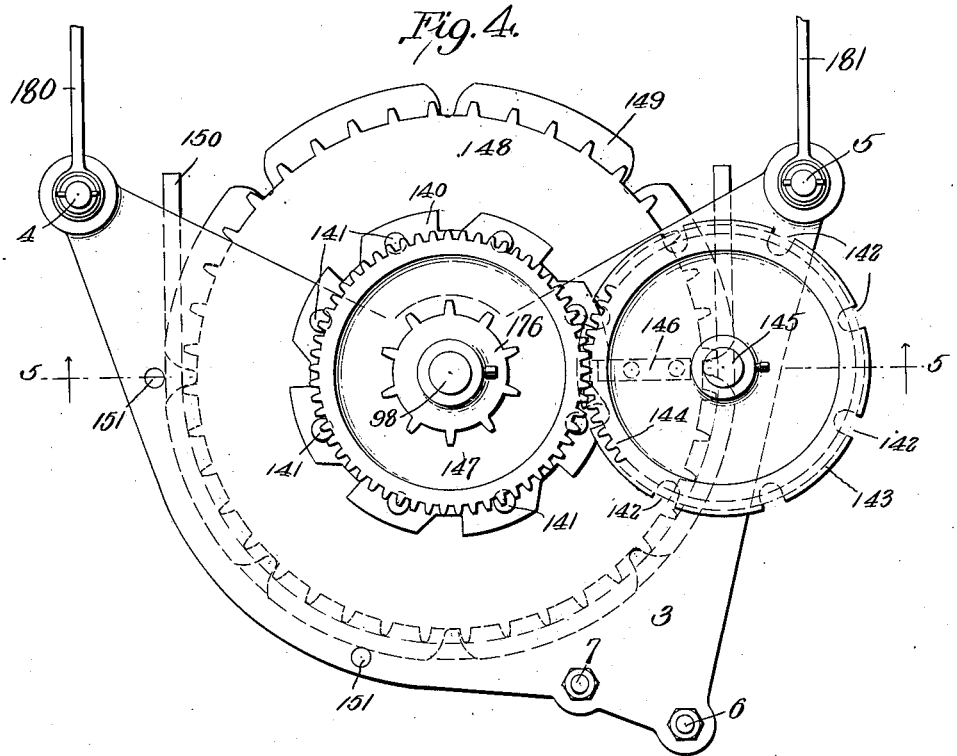
Figure 5:
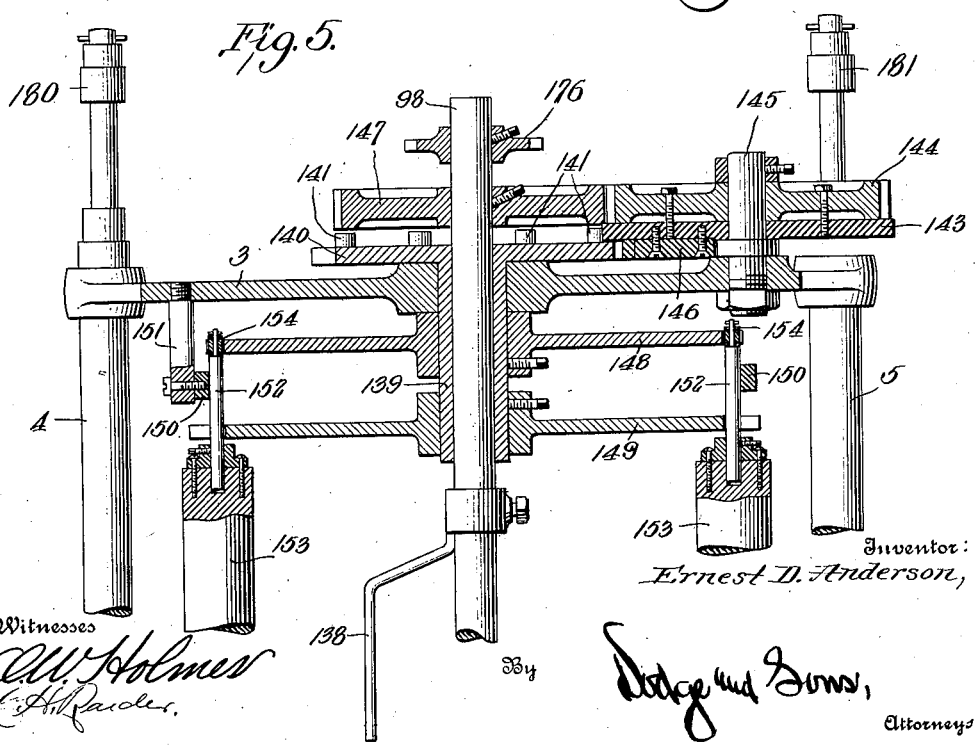
Figure 10:
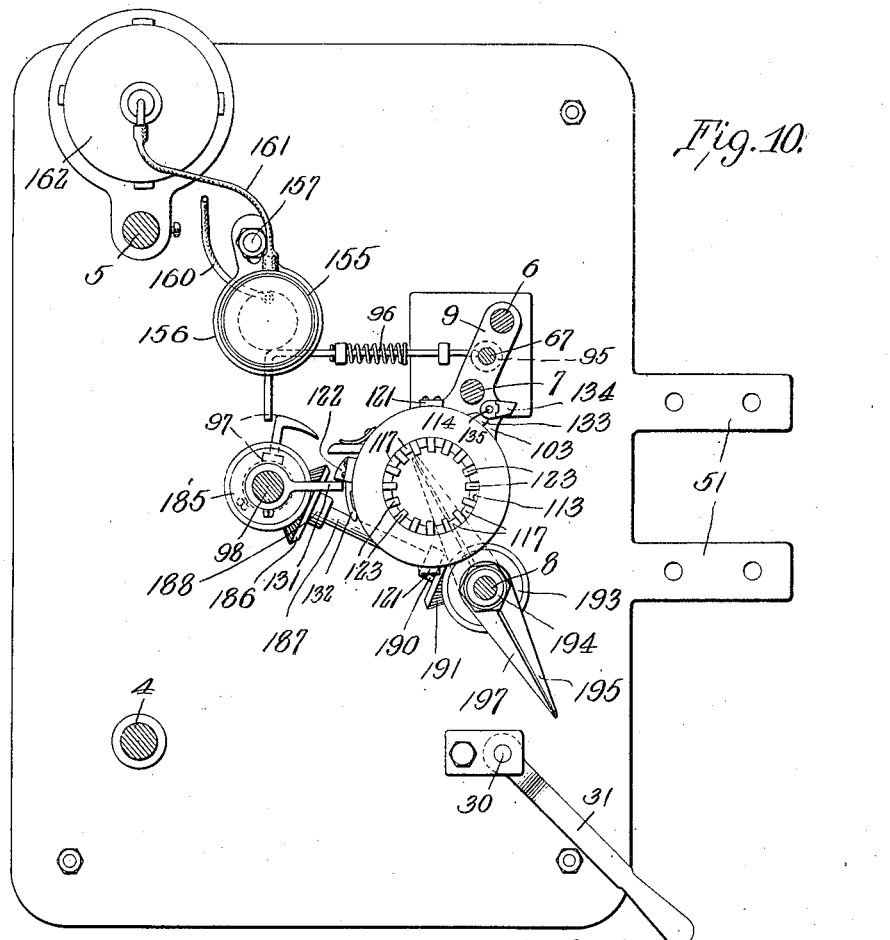
Figure 11:
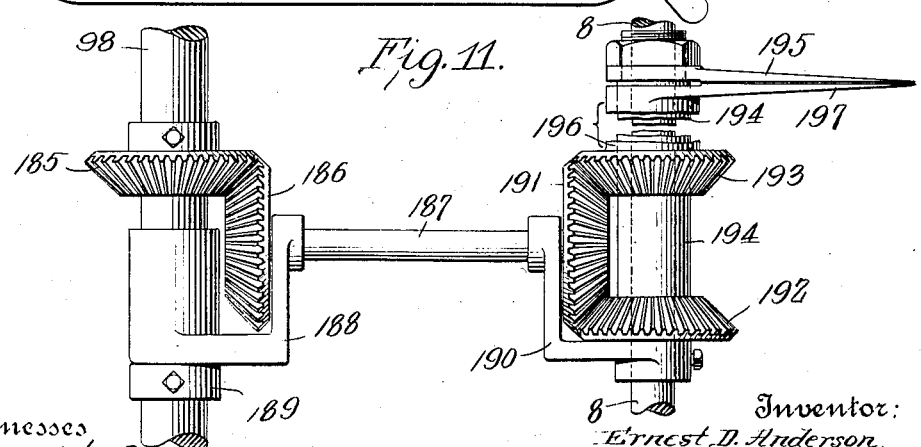
Figure 12:
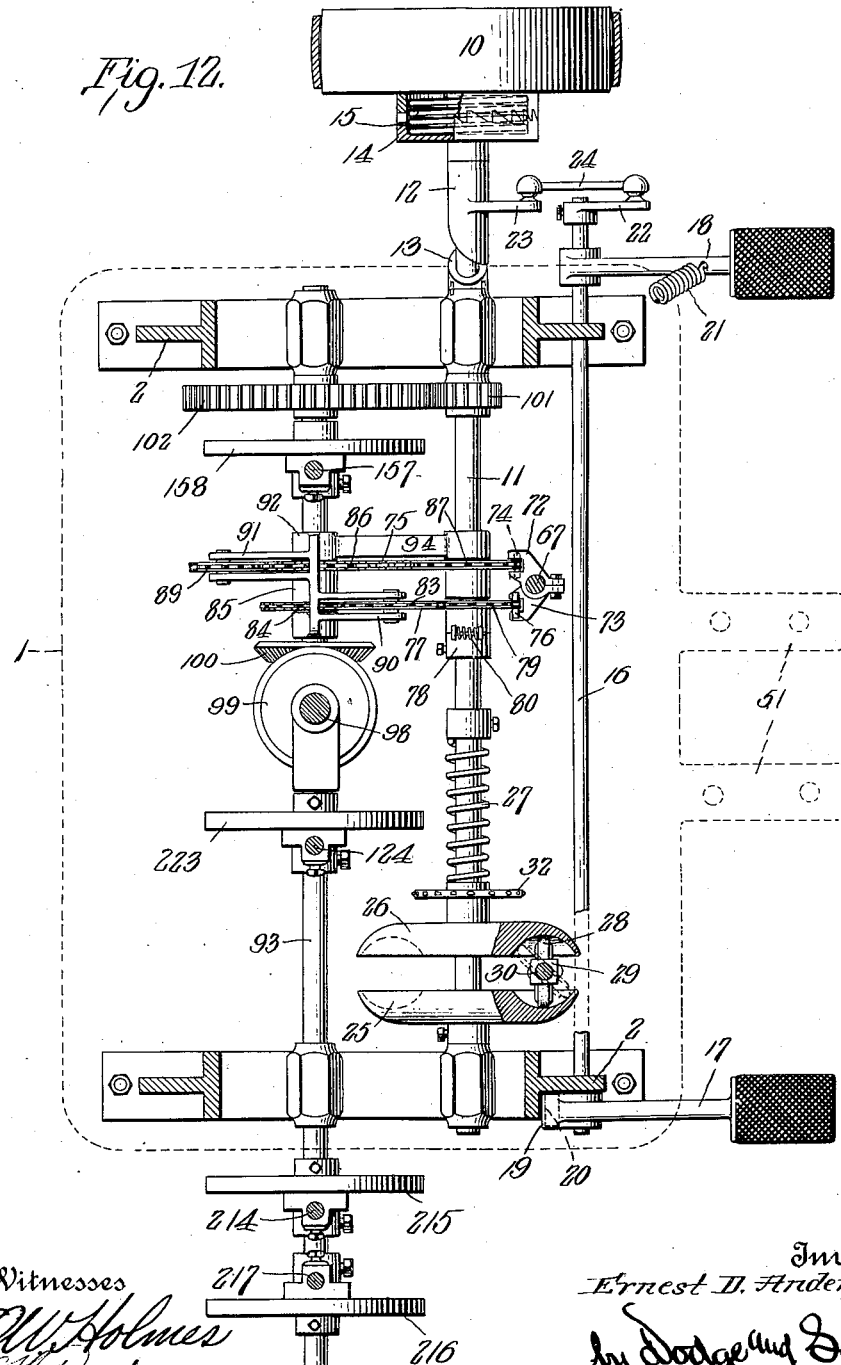
Figure 13:
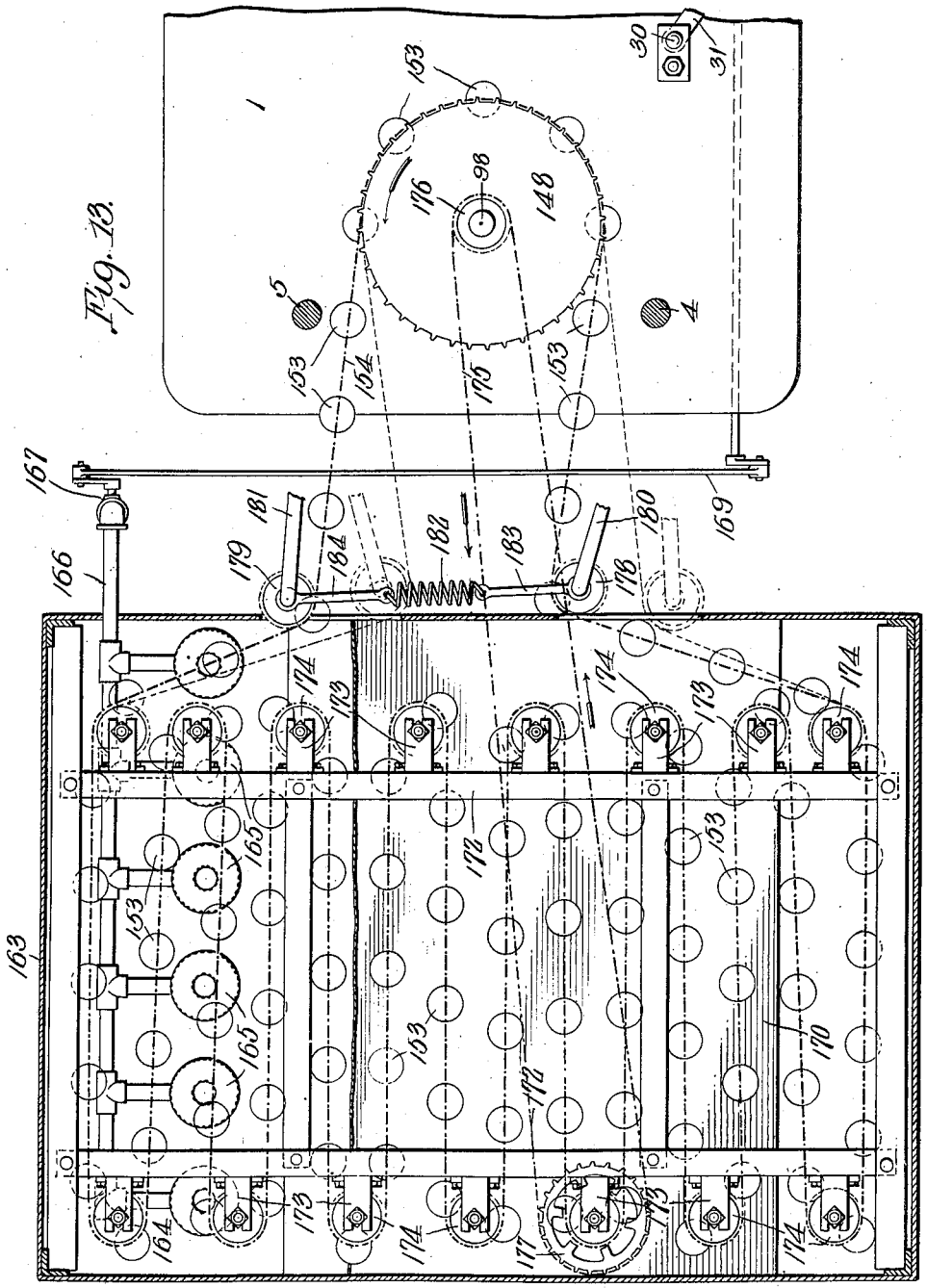
Figure 17:
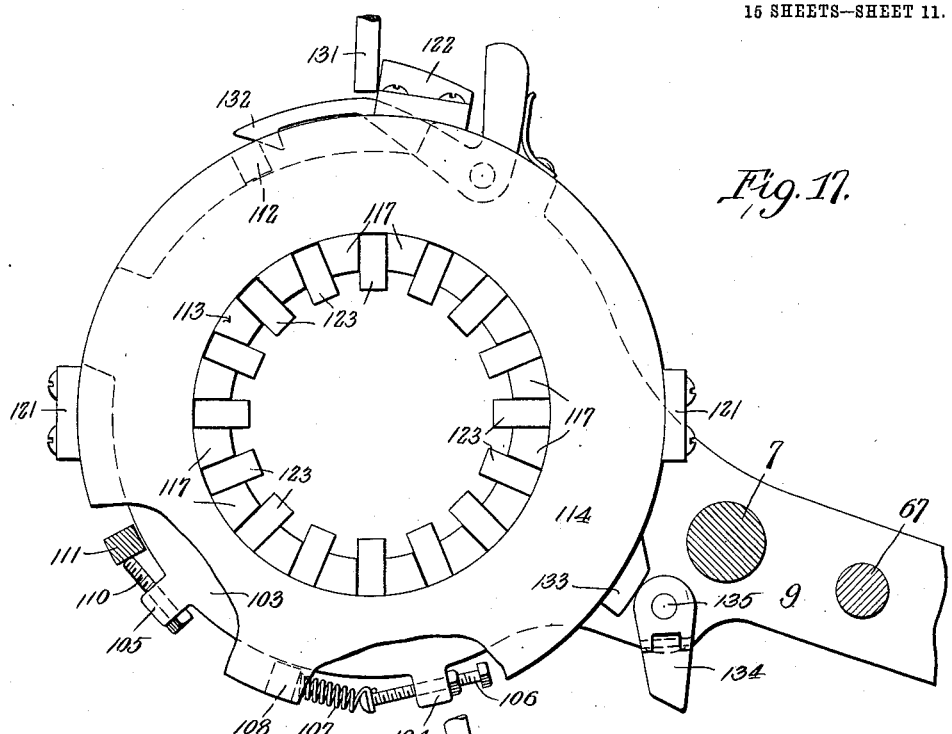
Figure 18:
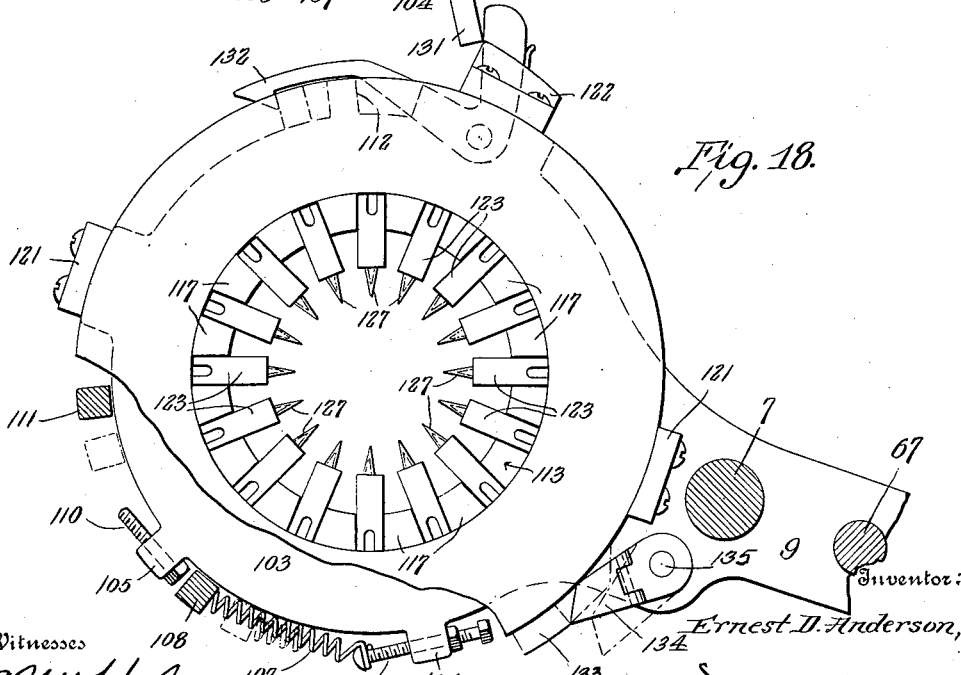
Figure 26:
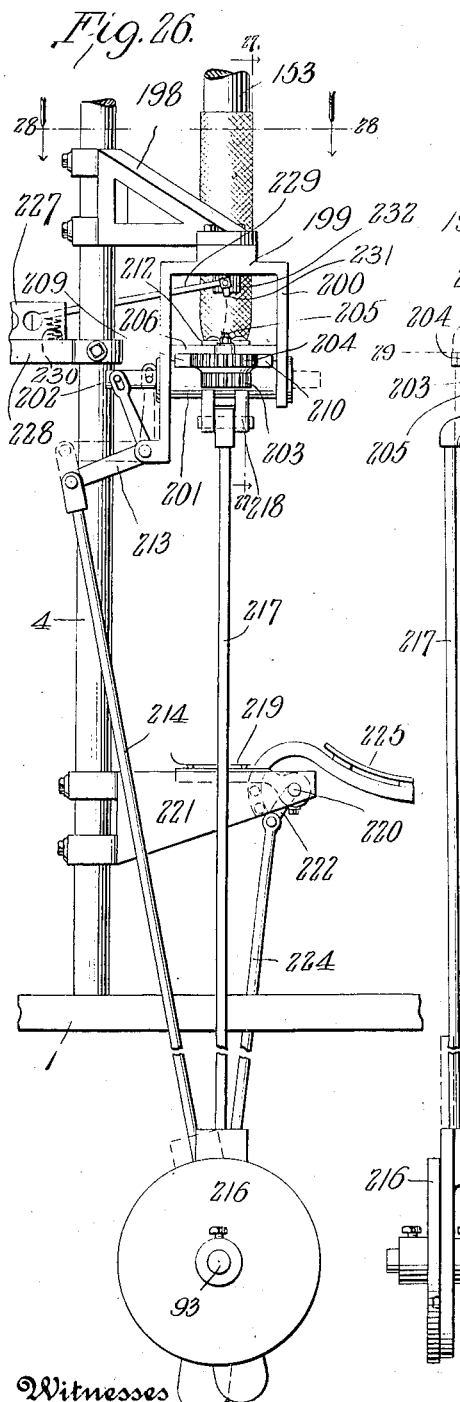
Figure 27:
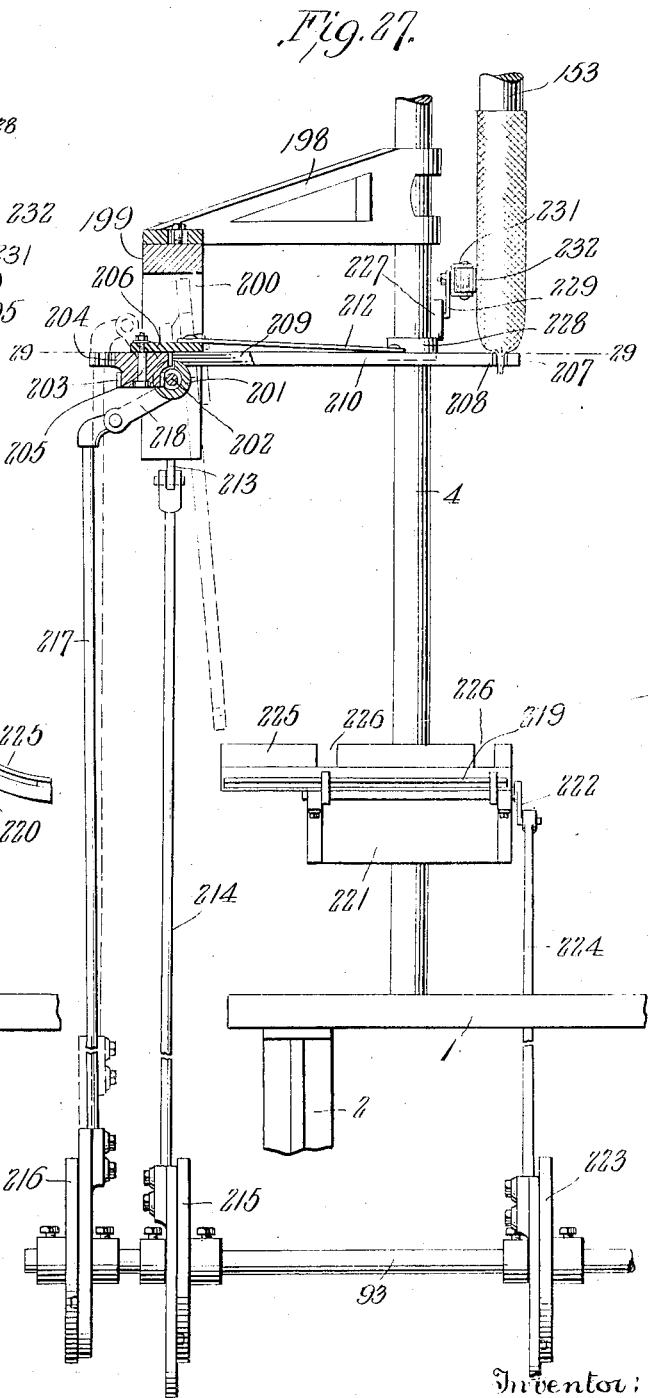

Figure 1 is a side elevation of the apparatus, parts being shown in section and the major portion of the drier omitted; Fig. 2, a top plan view, the packer mechanism being omitted; Fig. 3, a front elevation of the apparatus, the impregnating means being omitted and portions shown in section; Fig. 4, a top plan view, on an enlarged scale, of the form-feeding mechanism; Fig. 5, a vertical sectional view of the same, taken on the line 5 5 of Fig. 4; Fig. 6, a side elevation of the web elevating or raising mechanism, the table or bed of the machine being shown in section; Fig. 7, a diagrammatic perspective view of the operative portions of said elevating mechanism; Fig. 8, a perspective view of the supporting member or casting for the shafts of said mechanism; Fig. 9, a side elevation of the head-dip mechanism, the table being shown in section; Fig. 10, a horizontal sectional view on the line 10 10 of Fig. 1, illustrating the relation of the shear or severing blades to the other portions of the machine and also the locking device for the web-elevating mechanism; Fig. 11, a detail side elevation of the shear-operating mechanism; Fig. 12, a horizontal sectional view on the line 12 12 of Fig. 1; Fig. 13, a horizontal sectional view taken through the upper portion of the drying-chamber, the deflector-plate being broken away to show the burners below; Fig. 14, a top plan view of the web-elevator, portions being broken away and shown in section to more clearly illustrate the construction thereof; Fig. 15, a side elevation of the elevator; Fig. 16, a transverse vertical sectional view on the line 16 16 of Fig. 14; Fig. 17, a top plan view of the elevator, the parts appearing in full with the exception of the top needle-actuating plate, which is broken away in part to show the portions below; Fig. 18, a similar view, the parts being shifted and the elevating needles or fingers, with their coacting carriers, being moved inward to their full extent; Fig. 19, a vertical sectional view of the intermediate supporting-plate, the upper needle-actuating cam-ring, and the lower needle-carrier cam-ring; Fig. 20, a perspective view of a portion of each of said parts; Fig. 21, a detail view showing the actuating-block and its connection to the cam plates or rings; Fig. 22, a perspective view of said block; Fig. 23, a similar view of one of the needles and needle carriers and strippers; Fig. 24, a detail perspective view illustrative of the mechanism which is employed to gradually permit the retraction of the needles and needle-carriers; Fig. 25, an enlarged sectional view of the web distender and arrester; Fig. 26, an end elevation of the stripping, packing, and registering mechanisms; Fig. 27, a side elevation thereof, portions being shown in section; Fig. 28, a horizontal sectional view on the line 28 28 of Fig. 26, the stripping-jaws being closed; Fig. 29, a like view, the jaws being opened; and Figs. 30 to 32, inclusive, detail views of the cams employed in conjunction with the stripping and packing mechanisms.

In the drawings, 1 denotes the bed or table of the machine, supported upon suitable legs 2. A top plate 3 is arranged above the bed at a suitable distance therefrom, the plate being supported by a series of vertically-disposed rods 4, 5, 6, 7, and 8, 4 and 5 being located at the rear of the table, 6 and 7 being forward and slightly to the right of the center of the machine and serving primarily as guide-rods for the cross-head 9, which carries the web-elevating mechanism, and 8 located at the left forward side of the machine and serving as a support for the web-severing mechanism.

The belt or driving pulley (see Fig. 12) is designated by 10, and 11 is the main driving-shaft carried in suitable bearings secured to the frame of the table, a sliding sleeve or member 12 being interposed between a fixed cam 13 and a clutch member 14, splined upon shaft 11 and movable into engagement with the coöperating member of the clutch carried by the band-wheel. A heavy spring 15 tends to release the clutch, and the parts are brought together and locked by the following mechanism: Extending across the front of the machine and slidably mounted in the webs of the front legs 2 is a rod 16, having secured to it the foot-levers 17 and 18. Lever 17 is provided with a rearwardly-extending nose or lug 19, which when the parts are locked overlies a pin 20, Fig. 1, extending outwardly from the frame. A coiled spring 21 acts to raise the foot-levers and serves to rotate the rod 16 when the same is moved lengthwise in its bearings and nose 19 is free of pin 20, which condition is brought about by a slight sidewise pressure upon either of the foot-levers. A crank-arm 22 is secured upon the rod 16 and is connected to a similar arm 23, extending from sleeve 12, by a link 24, the parts being universally connected to permit endwise movement of the rod 16 and rotation of sleeve 12 to release the clutch when it is desired to stop the machine. Two foot-levers or pedals are shown in order that the machine may be operated from either side of the table. One, however, may be employed, and, in fact, any suitable starting and stopping mechanism may be used.

Secured upon and rotatable with shaft 11 is a driving-disk 25, a second complemental disk 26 being freely mounted on the shaft and urged toward the first disk by a spring 27. A transmission or driving wheel 28 coacts with the opposing faces of the disk, the wheel being carried by a yoke 29, secured upon a rod 30, which terminates above the table and carries an adjusting handle or lever 31, (see Figs. 1, 2, and 3,) frictionally held against accidental movement. Attached to and rotating with disk 26 is a sprocket-wheel 32, a sprocket-chain 33 passing about said wheel and a similar wheel 34, Figs. 1 and 2, mounted on the outer end of the supporting-shaft of a wringer-roll 35. Said roll 35 is the lowermost roll of a pair, the upper or companion roll 36 being adjustable toward the lower roll for a purpose presently to be described. A second pair of rolls 37 and 38 is placed above the tank 39, the lower roll 37 being driven from roll 35 by a chain 40.

Tank 39 is designed to contain the saturating solution, through which the web 41 is passed from a reel 42. An idle roll 43, located at the outer end of the tank, and a similar roll 44 adjacent to the first stand of rolls cause the tubular web (in a flattened condition) to pass through the solution for quite a distance before it is carried between the rolls 37 and 38. From these rolls, which tend to force the solution or impregnating liquid through the fibers, the web again enters the solution, passing beneath an idler 45 and then to rolls 35 and 36. These rolls being properly regulated remove any excess of impregnating material, so that the web leaves said rolls with just the required quantity of such material.

From the final expressing-rolls the web passes over a guide-roll 46, which is constantly driven by a belt 47, Fig. 2, that derives its motion from a pulley 48, mounted on the driving-shaft of roller 35.

The tank or trough 39 is supported at its outer end by legs 49, the inner end being secured to plates or boards 50, which in turn are secured to arms 51, extending outwardly from the front of the table or bed 1. A guiding-roll 52 is secured upon suitable brackets adjacent to the arms 51, and the web is allowed to drop between said roll 52 and guide-roll 46, forming a loop, as best shown in Fig. 1.

The wheel 28 is so adjusted with relation to the disks as to drive the wringer-rolls at such speed relative to the other parts of the machine that sufficient slack or a loop, as just noted, is always maintained in order that the web may not be subjected to strains or drawn through the wringers at an excessive speed. When long mantles are being made, the wringers must, of course, be driven faster than when short ones are being produced.

After leaving roll 52 the web passes under a guide-roll 53, journaled upon an axle extending outwardly from a bracket 54, adjustably secured upon rod 7, (see Figs. 1 and 3,) and thence over the web expander and retainer to a position where the upper end of the impregnated web may be grasped or engaged by the web-elevator.

The expander and retainer are shown in enlarged detail in Fig. 25. Secured to rods 6 and 7 is a bracket or casting 55, which forms the support for a plate 56, that in turn carries a removable bushing or collar 57, provided with a central aperture. A second plate 58 is supported from plate 56 by spacing tie-rods 59, said upper plate 58 likewise carrying a removable collar or bushing 60. The diameter of the lower portion of the bore of said bushing is substantially the same as that of the lower bushing; but the upper portion is given an outward flare corresponding to the face of the inverted frusto-conical head 61 of the distender. Said head is secured in the upper portion of tubular member 62, which carries at its lower end a point 63 that as the web is drawn over it opens the same into tubular form. Secured to the upper face of head 61 by a screw 64 and hard-rubber washer 65 is a circular brush 66, the bristles or fibers of which stand in a vertical position and form a yielding bed into which the needles or elevating-points may pass as they are projected into and through the web, as will presently appear.

Tube 62 may be loaded to the required extent to insure that it is always maintained in proper position, or, in other words, is prevented from being carried up by the web when the same is elevated in the act of passing a mantle length onto one of the forms. After a mantle length is severed the distender also drops to a slight extent and grasps or clamps the web between the inclined face of the bushing 60 and the complemental face of head 61, thereby preventing retrograde movement of the web. The parts maintain this position until the web-elevator is again lowered and has engaged the upper end of the web preparatory to ascending, which position is shown in Fig. 25.

The various portions of the distender and the bushings or collars 57 and 60 will preferably be formed of hard rubber in order that they may not be injuriously affected by the chemicals used in impregnating the web. Throughout the whole machine such material or some other inert substance will be employed wherever possible.

The cross-head 9, heretofore referred to, carries the web-elevating mechanism, raising and lowering the same into and out of line with the mantle-forms. Inasmuch as a series of such forms is employed, which are periodically brought into alinement with the elevator or web-carrier, it is necessary that the cross-head and elevator should likewise have a periodical movement, such movement taking place while the forms are stationary. The mechanism by which the movement of the cross-head is effected is shown in Figs. 3, 6, 7, 8, and 12. Rigidly connected to the cross-head 9 and extending downwardly through an opening in the bed 1 is a rod 67, which for the purpose of clearness may be termed a "piston-rod." The lower end of the rod is forked, and a wheel or pulley 68 is mounted therein, a cord or cable 69, having its ends fixed, as shown in Fig. 3, passing beneath said pulley and over a second pulley 70, mounted in brackets secured to the under face of the table or bed 1. A weight 71, carrying a pulley 71', is suspended from the cable intermediate pulley 70 and the adjacent point of attachment of the cable to the table, said weight serving as a counterbalance to the rod 67 and the parts carried thereby.

Rod 67 has secured to it two notched blocks 72 and 73, block 72 coacting with a cross-pin 74, carried by a sprocket-chain 75, and block 73 coacting with a cross-pin 76, carried by a second reversely-moving sprocket-chain 77. Secured upon the main driving-shaft 11 is a collar or driver 78, Fig. 12, and arranged adjacent thereto is a sprocket-wheel 79, about which chain 77 passes, a cushioning-spring 80 being interposed between the driver and wheel for the purpose of relieving the parts from shock or jar as one or the other of the pins 74 or 76 comes into contact with its respective block. Chain 77 also passes about an idler 81, mounted on a shaft 82, adjustable toward the bed 1, to take up slack, about an idler 83, and finally about a sprocket 84, which is secured to or formed as an integral portion of a hub 85, that has secured to it a second sprocket 86. Sprocket-chain 75 engages the upper portion of sprocket 86, from which it derives its motion, and passes about idler 87 on shaft 11, over idler 88, and about the idler 89. Idlers 83 and 89 are carried on shafts or axles mounted in arms 90 and 91, respectively, of a frame or casting. (Shown in detail in Fig. 8.) The lower tubular members 92 of said casting loosely embrace a second horizontally-disposed driving-shaft 93. The forwardly-extending arm 94 finds its support on shaft 11, which it loosely embraces.

As will be clearly seen upon reference to Fig. 7, the chains 75 and 77 are driven in reverse directions, and as a consequence pins 74 and 76 will alternately raise and lower the rod 67 by alternately acting on the blocks 72 and 73, pin 74 riding from beneath the block 72 when the block stands in the same horizontal plane as the upper face of idler 88 (see dotted lines, Fig. 6) and pin 76 riding off of block 73 when the rod is fully lowered. (See Fig. 7.)

By adjusting the blocks different lengths of movement may be imparted to the piston-rod and different lengths of mantles, either longer or shorter, thereby produced without other change or alteration and without wasting the web.

In order to temporarily lock the piston-rod 67 while it is in its lowest position, and thus prevent interference of the elevator with a proper feeding of the forms, the rod is provided with an adjustable collar 95, Figs. 3, 6, and 10, over which when the rod is in its lowest position a spring-pressed bolt 96 will ride. The bolt is retracted just previous to pin 74 contacting with block 72 by a wiper-cam 97, which is adjustably secured to a vertically-disposed shaft 98. Said shaft carries at its lower end a bevel-gear 99, Figs. 3 and 12, which meshes with a similar gear 100, secured to shaft 93, that receives its motion from shaft 11 through pinion 101, secured thereto, which meshes with a gear 102, secured upon shaft 93. Inasmuch as the piston-rod 67 and shaft 98, which carries cam 97, are operated from a single source of power, the cam may be so adjusted as to function at just the proper moment.

The mechanism which is employed for engaging the uppermost end of the web, or that end which after the web has been threaded around the distender lies adjacent to the brush or yielding bed 66, is best shown in Figs. 6 and 14 to 24, inclusive. The cross-head 9 is provided with a laterally-extending portion or supporting-plate 103, having a centrally-disposed aperture, and with lugs 104 and 105. Lug 104 carries an adjustable screw 106, a spring 107 being secured thereto and to a lug 108, extending downwardly from the under face of the carrier cam-ring 109. A stop-screw 110, carried by lug 105, acts against a lug 111, extending downwardly from the cam-ring 109. Said cam-ring is also provided with a third downwardly-extending lug 112, Fig. 19, the purpose of which will presently appear. Secured upon the supporting-plate 103 is a plate or member 113, which serves the function of holding and guiding the combined needle carriers and strippers and likewise as a support for the needle-actuating cam plate or ring 114. Said carrier-holding plate 113 is provided with a downwardly-projecting hub 115, the lower face of which rests upon plate 103, to which it is securely fastened. It is likewise provided with a series of radially-disposed openings or ways 116 and with upstanding lugs or shoulders 117 intermediate said openings at the inner ends thereof. As will be seen upon reference to Figs. 16 and 19, the upper and lower faces of the body or wings of the member 113 are inclined from the center downward. The carrier cam-ring 109 rests upon the supporting-plate 103 and underlies the carrier-plate 113, the hub 115 passing through the cam-ring and securely holding the same in place. Said cam-ring is provided with a series of angularly-inclined slots or grooves 118, which extend from the outer edge of the ring toward the inner edge, where they merge into short grooves or recesses 119, arranged concentric with the axis of the ring. The upper cam-ring or the needle-actuator is provided with a series of angularly-disposed slots or grooves 120, which extend from the inner to the outer edge thereof. Said ring overlies the carrier-plate 113, and the upstanding lugs 117 pass into the cam-ring and serve to center the same. The two cam-rings 109 and 114 are connected to each other by plates 121 and an actuating-block 122.

Mounted in each of the slots 116 is a needle carrier and stripper 123 of the form best illustrated in Fig. 23. The carrier is formed of a single piece substantially square at its outer end and provided with a hole or opening for the passage of the needle therethrough. The rear end of the carrier is reduced in height, as at 124, said reduced portion having a groove or channel 125 in its upper face, which is formed as a continuation of the hole in the head of the carrier. A pin or stud 126 extends downwardly from the under face of the carrier into the cam-grooves 118.

The needles 127 are preferably beveled at their outer ends, the rear end 128 of each being turned up at right angles to the body. A block 129, having a fin or rib 130, is secured to the upturned end 128, said fin or rib extending into and coacting with a groove 120 of the cam-ring 114.

It is designed that the needles and carriers shall be drawn out to their full extent when the mantle length has been completely passed onto the form and also when the parts are being lowered preparatory to again engaging the upper end of the saturated web. This position is shown in Figs. 14, 15, 16, and 17.

While the elevating mechanism is in its lowest position, or that shown in Figs. 6 and 25, it is necessary that the carriers and needles be projected, and to effect this an arm 131, affixed to shaft 98, is carried around thereby and acts upon the square face of the actuating-block 122, thus rotating the cam-rings and throwing the parts into the positions shown in full lines in Fig. 18. As this takes place lug 112 will pass under the beveled nose of a spring-pressed hook 132, pivotally secured to the supporting-plate 103, and at the same time a beveled-faced lug 133, projecting from cam-ring 109, rides beneath the pivoted nose of a locking arm or detent 134. Said detent is secured upon the upper end of a shaft 135, mounted in the cross-head 9, the shaft being encircled by a spring 136, which tends normally to rotate the shaft in such direction as to swing the detent away from the lug. The lower end of the shaft 135 is bent outwardly and overlies a cone-shaped cam-block 137, secured upon rod 7, said cam serving to throw the detent inwardly toward lug 133 when the elevator is lowered and to permit the spring to gradually move the detent out of contact with the lug 133 as the end of shaft 135 rides up over the inclined face of the cam when the elevator begins its upward movement. The cam-rings are thus gradually allowed to rotate in a direction which will withdraw the needles and carriers; but as such withdrawal or inward movement must only be sufficient to permit the web to be drawn up on the form without the needles coming into contact therewith the full return movement of the cam-rings must be arrested. This is effected by the hook 132 coming into engagement with lug 112, the lug passing from the dotted position at the right, Fig. 18, to the other dotted position, where it is shown in contact with the hook. This position is maintained until the web is fully drawn on the form and the mantle length severed from the web. At such time an arm 138, secured to the vertical shaft 98, contacts with the outwardly-projecting arm of the hook 132 and withdraws the same from engagement with the lug 112, thereby permitting spring 107 to come into action and draw the cams around to the position indicated in Fig. 17, thereby wholly retracting the needles and carriers. As the pins 126 of the carriers stand in the recesses 119 when the retraction begins, the needles will be moved back into the carriers and the webbing will be stripped off the needles, after which upon further rotation of the cams the needles and carriers move back together.

While the elevator is raised the shears, hereinafter described in detail, come into action and sever the web slightly below the end of the form, after which the elevator, with the needles and holders fully retracted, is moved downward, the mantle lengths adhering to the forms and remaining thereon until positively removed.

As before noted, the saturated mantle lengths are placed successively upon a series of forms and after being subjected to a head solution are passed into a drier. The form carrier and drier will now be described, reference being had to Figs. 1 to 5, inclusive, and Fig. 13.

Top plate 3 is provided with an opening, (see Figs. 4 and 5,) in which is loosely mounted the elongated hub 139 of a toothed disk 140, said disk being provided with a series of upstanding studs 141 adjacent to the periphery thereof. The studs are arranged to pass into pockets 142, formed in the edge or periphery of a disk 143, which is secured to the under face of a gear 144, carried by a stub-axle 145, extending upwardly from top plate 3. To the under face of disk 143 is secured an arm 146, which at each revolution of gear 144, and consequently disk 143, engages one of the teeth of disk 140, and thus advances said disk until it rides out of contact with said tooth. As the disks are rotated one of the studs 141 will pass into one of the pockets 142, and thus lock the disks together, causing a continued rotation thereof after the arm is disengaged until the stud rides out of the pocket, when disk 140 will come to rest. This further movement of the disk 140 will again bring the square face of one of its teeth into the path of movement of the outer end of arm 146 ready to be again engaged thereby. Gear 144 is driven by a gear 147, secured upon shaft 98 above disk 140.

A sprocket-wheel 148 is secured upon hub 139 immediately below the top plate 3, and a pocket-wheel 149 is mounted upon the lower end of said hub, the pockets flaring outwardly, as best shown in Fig. 4.

A positioning and locking rail or track 150, substantially U-shaped in contour, is supported by arms 151, extending downward from plate 3, said rail occupying a position intermediate sprocket 148 and the pocket-wheel 149. Said rail bears against the supporting-rods 152 of the forms 153, the rods being secured at their upper ends to an endless sprocket-chain 154, which passes about sprocket-wheel 148 and through the drier, as will presently appear. By this construction the rods 152 are closely held against the bottom of the pockets, and consequently the forms are prevented from swinging, or, in other words, they are held against movement while the web is being drawn thereon, when the head-dip is being applied, and while the dried mantle is stripped from the form.

From the foregoing it will be noted that an intermittent step-by-step movement is imparted to the form-carrying sprocket-chain 154, the chain moving in the direction indicated by the arrows in Fig. 13 to advance the forms into and withdraw them from the drying-chamber.

Disks 140 and 143 with their coacting parts act to advance the forms step by step over the elevator and dip-cup and to temporarily lock the forms in such position against further movement.

Before passing into the drying-chamber the downwardly-projecting end of the mantle which has just been placed on the form is subjected to a head solution that has the effect of rendering the same relatively tough. This is automatically accomplished by the means shown in Figs. 3, 9, and 12. A cup or receptacle 155, mounted on a table 156, secured upon the upper end of a vertically-moving rod 157, stands in line with the forms as they pass from the web-elevator to the drier. Rod 157 is periodically raised by a cam 158, secured upon shaft 93, the upward movement taking place while the sprocket-wheel 148 and pocket-wheel 149 are at rest and the forms immediately adjacent thereto are also at rest. The necessary solution may be fed into the cup 155 in any approved manner, the construction shown comprising a feeding-receptacle 159, discharging the solution into a flexible tube 160, which opens into the lower portion of the cup. Any excess will flow from the cup through a tube 161, leading to an overflow-receiving receptacle 162. Suitable brackets are shown as carried by rod 5 for supporting the receptacles.

The arrangement of the drier is best shown in Figs. 3 and 13. Said drier comprises a chamber 163, substantially rectangular in cross-section, and a downwardly-extending hollow leg 164, in which are located a series of burners 165, receiving their supply through a pipe 166, said pipe being controlled by a valve 167, an operating-handle 168, and an intermediate connecting-rod 169. A diaphragm 170 extends horizontally across the lower portion of the chamber from a point above the burners to nearly the opposite side thereof, thereby causing the hottest air to pass over and act upon those mantles which are just leaving the drier, while those that are entering come into contact with the coolest air within the drier, the heated air finding its exit through an opening 171. By this arrangement the dampness of the freshly-made mantles will not be driven onto those previously dried. Extending across within the upper part of the drying-chamber 163 are two supporting-bars 172, to which are secured a series of brackets 173, said brackets in turn carrying sprocket-wheels 174, about which the sprocket-chain 154 passes. The chain within the drier is constantly driven by a sprocket-chain 175, which passes around a sprocket-wheel 176, secured upon the upper end of shaft 98, and a somewhat larger sprocket 177 so geared to chain 154 as to constantly drive the same in the direction indicated by the arrows in Fig. 13. As a portion of chain 154 and forms 153, carried thereby, periodically come to rest when the chain passes about sprocket 148 and pocket-wheel 149, it is necessary that a yielding support or slack-adjuster be interposed in the run of the chain, and to this end a pair of sprockets 178 and 179, carried at the outer ends of swinging arms or brackets 180 and 181, supported, respectively, upon the upper ends of rods 4 and 5, are employed. The arms or brackets are maintained in substantial parallelism by an interposed spring 182, connected to said brackets by links 183 and 184. As chain 154 passes along the inner adjacent faces of said sprockets 178 179 the brackets will swing to the right or to the position indicated in Fig. 13 when the sprocket 148 is at rest, the extreme movement of the bracket being shown. Immediately the sprocket 148 begins to rotate the arms will be drawn over into the position indicated in dotted lines. Thus the slack-adjuster permits the chain and forms to move constantly through the drier, while at the same time maintaining the chain taut and in such position that it will readily respond to the demands of the feeding-sprocket 148.

After the elevator has fully passed a mantle length onto one of the forms and has come to rest in its elevated position it becomes necessary to sever the web at a point slightly below the lower end of the form. The mechanism by which this is accomplished is shown in Figs. 3, 10, and 11. Secured to shaft 98 is a bevel-gear 185, which meshes with a similar gear 186, carried by a shaft 187. Said shaft is supported at one end by a bracket 188, swiveled on shaft 98 and held in place by a collar 189, the opposite end of the shaft being journaled in a bracket 190, secured to rod 8. A second bevel-gear 191 is secured to shaft 187, said gear meshing with gears 192 and 193. Gear 192 is connected to a sleeve 194, which finds its bearing on rod 8 and carries at its upper end a shear-blade 195, while gear 193 is provided with a sleeve 196, encircling sleeve 194 and carrying shear-blade 197, which lies immediately below blade 195. The gears are so proportioned and arranged that the blades are brought together on the web just as the elevator comes to rest in its highest position, this relation of the parts being shown in dotted lines in Fig. 10. The blades are then swung around to the full-line position out of the way of the descending elevator.

To strip the dried webbing from the forms and to pack and register the number of completed mantles, the mechanism shown in detail in Figs. 1 and 26 to 32, inclusive, is employed. Secured to rod 4 is a bracket 198, to the outer lower face of which is adjustably secured a frame 199, provided with downwardly-extending arms 200. Said arms carry a rotatable barrel piece or sleeve 201, in which is mounted a rack-bar 202, the bar meshing with a pinion 203, formed as an integral part of or secured to a gear 204, which overlies the same, said gear and pinion being pivotally mounted on a stud-axle 205, carried by a cross-bar 206, which is secured to or formed as an integral part of the barrel 201. Jaws 207 and 208, carried by arms 209 and 210, which are provided with teeth to engage gear 204, are arranged upon opposite sides of the web, and as the rack 202 is moved endwise to the left the jaws are drawn together and engage the lower end of the mantle length. The arms 209 and 210 are supported by a cross-bar 211, secured to an arm 212, extending outwardly from the cross-bar 206. Motion is imparted to the rack 202 by an elbow-lever 213, which is actuated by a rod 214, deriving its motion from a cam 215, mounted on shaft 93. To swing the outer ends of the jaws downwardly, and thus strip the mantle from the form after they have grasped the lower end of the mantle, as in Fig. 27, a second cam 216, also carried by shaft 93, is employed, said cam imparting endwise movement to a rod 217, which is pivotally secured at its upper end to an arm or lever 218, that extends outwardly from the barrel 201. As the barrel is rotated the arms 209 and 210, with the mantle clasped between the closed jaws, swing downwardly into the position shown in dotted lines, Figs. 27, where they come to rest for a short period, owing to the formation of cam 216, and during this period of rest the jaws are separated. The arms with the jaws still separated are then moved farther or into a vertical position, which movement permits the mantle to drop clear of the jaws onto an oscillating platform 219. When so deposited, the arms with the jaws still separated are again swung up into their horizontal position. Said platform 219 is mounted on a shaft 220, carried in the outer end of a bracket 221, secured upon rod 4. A crank 222 is secured to shaft 220, and an oscillating movement is imparted thereto from cam 223 and rod 224, which is connected to the crank. By reason of the formation of the cam 223 platform 219 is swung over toward a slightly-concaved fixed bed or table 225 as the gripper-arms are moving upwardly, carrying with it the deposited mantle. As will be seen upon reference to Fig. 27, the table is notched, as at 226, to permit the arms of the platform or packer 219 to pass therethrough and carry the mantle against those which have been previously deposited and to advance the pile toward the edge of the fixed table, from which they are removed from time to time. The platform is of course returned to its horizontal position before another mantle is withdrawn from a form and brought down by the jaws.

In order that an accurate record may be kept of the number of mantles which pass through the machine, a register 227 is secured on a bracket 228, supported by rod 4, and an arm 229, normally pressed upward by a spring 230 within the register, extends outwardly from the operative portion of the register to a point slightly above the gripping-jaws. The outer end of the arm carries a yoke 231, in which is mounted a roller 232, having a vertically-disposed pivot, the surface of the roller being slightly roughened.

As the mantle is drawn off the form the roller moves with it, carrying arm 229 downwardly, and thereby actuating the register. After the mantle is fully withdrawn and the form again fed forward out of contact with the roller the spring 230 lifts the arm, and the roller stands in position to move onto the surface of the next mantle. As the roller bears firmly against the form, the register will of necessity be actuated. Again, the register will not function unless there be a mantle on the form, so that the register is not actuated when the machine is running idle and does not come into operation until a mantle-covered form is brought into juxtaposition therewith.

From the foregoing it will be seen that the machine is entirely automatic in its action and it is only necessary for the attendant to see that the tank and head-dip cup are supplied at all times and that the proper temperature is maintained within the drier. As before noted, the machine is capable of making mantles of various lengths, this being done without waste of the webbing, no trimming being required.

With the forms suspended as above described the impregnating solution flows to the head of the mantle as it passes through the drier, thus reinforcing the webbing where the greatest strength is needed. It is also advantageous to subject the mantle to the head solution before the impregnating solution has dried, for the reason that the head solution mixes more readily with the mantle solution while the webbing is in this condition. Furthermore, the solution upon the head is graduated in strength, inasmuch as the tip of the head remains in the solution longer than the other portions thereof. In case the head-dipping is done after the mantle is dried the heading solution will not flow evenly and ends abruptly.

While I have thus described the invention in detail, it is manifest that the machine is susceptible of variations in many of its parts. Thus, for instance, the head-dip may be omitted and again a different form of drier might be employed. So, too, many changes will suggest themselves to those skilled in the art for effecting the various movements which are necessary to the operation of the machine. In other words, in so far as the generic invention is concerned the claims are to be given a broad interpretation.

Having thus described my invention, what I claim is—

1. In a machine of the character specified, the combination of means for impregnating the web; means for passing said web in mantle lengths onto a series of forms; means for drying the mantles thus supported; and means for withdrawing the mantles from the forms.

2. In a machine of the character specified, the combination of means for impregnating a continuous web of material; a series of forms; means for placing the web successively onto the forms; and means for severing the web at a point adjacent to the end of the form.

3. In a machine of the character specified, the combination of means for impregnating a continuous web of material; a series of forms; means for passing the web onto the forms successively; means for severing the web after it is passed onto the form; and means for drying the severed lengths of web while still upon the forms.

4. In a machine of the character specified, the combination of means for impregnating a continuous tubular web of material; a series of forms; a distender about which the web passes; means for drawing the web successively over the forms; and means for severing the web after it is passed onto the form.

5. In a machine of the character specified, the combination of a distender about which the tubular web is drawn; a form; means for drawing the web past the distender and onto the form; and means for severing the web at a point intermediate the form and distender.

6. In a machine of the character specified, the combination of a gravitating distender; a support therefor; a form; means for drawing a tubular web over the distender and onto the form; and means for severing the web at a point intermediate the form and distender.

7. In a machine of the character specified, the combination of a gravitating distender; means for drawing a tubular webbing over and past the same; and means for severing the webbing at a point above the distender.

8. In a machine of the character specified, the combination of a suitable support; a weighted distender therein; means for drawing a tubular webbing over the distender; and means for severing a mantle length from the webbing.

9. In a machine of the character specified, the combination of a suitable support having an outwardly-flaring face; and a weighted distender provided with an enlarged head having its face complemental in form to that of the support.

10. In a machine of the character specified, the combination of means for holding a tubular web in a distended condition; a form arranged above the same; and means for engaging the upper end of the web and passing it onto the form.

11. In a machine of the character specified, the combination of means for holding a tubular web in a distended condition; a form arranged above the same; means for engaging one end of the web and carrying the same onto the form; and means for severing the web at a point below the form.

12. In a machine of the character specified, the combination of means for holding a tubular web in a distended condition; a form arranged above the same; means to engage the end of the web and carry the same around the form; means for severing the web; and means for releasing the engaging means and moving it away from the form with the mantle length thereon.

13. In a machine of the character specified, the combination of means for impregnating a continuous tubular web of material; a distender for the web; a series of forms; and means for drawing successive mantle lengths of the web past the distender and onto the forms.

14. In a machine of the character specified, the combination of means for impregnating a continuous tubular web of material; means for distending the web and preventing retrograde movement thereof; a series of forms; and means for passing successive mantle lengths of the web onto said forms.

15. In a machine of the character specified, the combination of means for impregnating a continuous tubular web of material; means for distending the web and preventing retrograde movement thereof; a series of forms; means for moving said forms step by step; and means for passing a mantle length of web onto each form as it comes into line with said means.

16. In a machine of the character specified, the combination of means for impregnating a continuous tubular web of material; means for distending the same; a series of forms; means for bringing said forms successively into line with said distender; means for passing the web from the distender onto said forms successively; and means for severing the web each time it is passed onto a form.

17. In a machine of the character specified, the combination of means for holding a web in a distended condition; a form; a series of needles arranged to pass into the web; means for raising said needles with the engaged web and thereby passing the web onto the form; and means for retracting said needles after the web is fully elevated.

18. In a machine of the character specified, the combination of a distender for holding a web of material in a substantially tubular condition; a form; an elevator for the web, having means to engage the web adjacent to the distender and to carry the same over the form; and means to retract said engaging means when the elevator reaches the limit of its upward movement.

19. In a machine of the character specified, the combination of a distender arranged to hold a web of material in a substantially tubular condition; a form located above the same; a series of needles arranged around the distender; means for projecting said needles into the web; means for raising the needles and thereby carrying the web onto the form; and means for retracting said needles.

20. In a machine of the character specified, the combination of a form; an elevator for carrying the web over the form; a series of needles mounted upon the elevator and arranged to engage the web; and strippers for said needles.

21. In a machine of the character specified, the combination of a form; and a carrier for drawing a tubular web onto said form, the carrier being substantially ring-shaped and provided with means projecting inwardly to engage the web from its outer face.

22. In a machine of the character specified, the combination of a form; a carrier for drawing a tubular web onto said form; a series of needles mounted upon said carrier; and means for moving said needles to carry them into and out of engagement with the web.

23. In a machine of the character specified, the combination of a form; a carrier for drawing a tubular web onto said form; a series of needles mounted and movable upon said carrier; means for projecting and withdrawing the needles; and strippers for the needles.

24. In a machine of the character specified, the combination of a form; an elevator arranged to draw a tubular web onto the form; a series of needle-carriers extending into the central opening in said elevator; a needle mounted and movable in each of said carriers; and means for projecting and withdrawing said needles and needle-carriers.

25. In a machine of the character specified, the combination of a web-distender provided with a yielding bed upon its head; a web-carrier; and a series of needles mounted upon the carrier, the points of the needles standing in alinement with the yielding bed when the parts are in such relation that the needles are about to engage the web.

26. In a machine of the character specified, the combination of a web-distender; a brush carried at the upper end thereof; a web-carrier; and a series of needles mounted upon the carrier, the points of the needles standing in alinement with the brush when the parts are in such relation that the needles are about to engage the web.

27. In a machine of the character specified, the combination of a web-distender adapted and arranged to hold a tubular web in a distended condition; a form arranged above the distender; a supporting-plate; a series of needle-carriers mounted thereon; a needle arranged in each of said carriers; means for projecting said needles inwardly to engage the web when the plate is in its lowest position; means for raising said plate with its attached parts; and means for successively withdrawing the needles and carriers from engagement with the web when the same has been fully drawn upon the form.

28. In a machine of the character specified, the combination of a web-distender; a form arranged above the same; a supporting-plate provided with an opening; means for moving said plate from the distender and over the form; and means carried by said plate to engage the uppermost end of the web and carry it over the form.

29. In a machine of the character specified, the combination of a web-distender; a form arranged above the same; a supporting-plate provided with an opening; means for moving said plate from the distender and over the form; a slotted member carried by said plate; a series of needle-carriers mounted in said slotted member, each carrier being provided with a downwardly-projecting pin; a cam-ring coacting with said pins; a needle slidably mounted in each of said carriers; a cam-ring coacting with said needles and serving to move them slightly in advance of the needle-carriers; means for actuating said cam-rings when they are in their lowermost position; means for holding the cam-rings in their shifted position as the supporting-plate is moved upwardly; and means for returning the cam-rings to retract the needles and carriers when the web is fully elevated.

30. In a machine of the character specified, the combination of a web-distender; a form; a supporting-plate provided with a central opening; a carrier-plate, provided with a series of slots, secured upon the supporting-plate; a series of needle-carriers mounted in said slots and projecting inwardly into the central opening in the carrier-plate, each of said carriers being provided with a downwardly-projecting pin; a cam-ring coacting with said pins, said ring being formed with cam-slots having inactive sections; a needle mounted in each of said carriers; a block secured upon the upturned end of each needle; a cam-ring coacting with said blocks; means acting to rotate the cam-rings to their full extent when the parts are in line with the distender; means permitting a slight backward rotation of the cam-rings as the carrier-plate begins to move away from the distender; and means to fully retract the cam-rings and consequently the needles and needle-carriers when the web has been drawn to the desired extent over the form.

31. In combination with a carrier-plate provided with a series of slots; a series of needle-carriers mounted in said slots, each carrier being provided with a downwardly-projecting pin; a cam-ring coacting with said pins, said ring having a downwardly-projecting locking-lug, a stop-lug, and a laterally-projecting lug; a needle mounted in each of said carriers; a cam-ring for actuating the same; connections between said cam-rings; a spring-actuated hook arranged adjacent to the locking-lug and coacting therewith; a spring-actuated locking-arm coacting with the laterally-projecting lug; means for normally holding said arm in contact with the lug; a spring connected to the cam-rings and acting to move the same so as to retract the needles and carriers; means for rotating the cam-rings in opposition to said spring, when the parts are in their lowest positions; and means for releasing the hook when the parts have been fully elevated.

32. In a machine of the character specified, the combination of means for holding a tubular web in a normally distended position; a form arranged above the same; a supporting-plate having an opening into which the web may extend; a series of needles carried by said supporting-plate; means for moving said needles inwardly to their full extent when the supporting-plate is in its lowest position; means for retracting said needles to a slight extent as the plate makes its initial upward movement; and means for fully retracting the needles when the plate is fully elevated.

33. In a machine of the character specified, the combination of means for impregnating a tubular web; a fixed supporting-plate; a bushing carried thereby; an upper plate; rods connecting said plates; a bushing carried by said upper plate, the bushing being provided with an outwardly-inclined face; a tubular member extending into said bushings, said member being provided with a point at its lower end; a frusto-conical head secured to the upper end of the tubular member; a brush mounted on the head; a form; and an elevator for the web, said elevator being provided with a series of needles arranged to engage the web when the needles are in line with the brush.

34. In a machine of the character specified, the combination of a web holder and distender; a form; an elevator arranged to carry the web from the holder and to pass the same onto the form; a cross-head to which said elevator is attached; a rod for actuating the cross-head; a pair of blocks adjustably mounted on said rod; a pair of reversely-moving members arranged in line with said blocks; and an actuating-pin carried by each member.

35. In a machine of the character specified, the combination of means for supplying impregnated webbing; a form; an elevator for carrying the webbing onto the form; and adjustable mechanism for moving the elevator to a greater or less extent, whereby mantles of different lengths may be formed, substantially as described.

36. In a machine of the character specified, the combination of means for supplying impregnated webbing; a form; an elevator for carrying the webbing onto the form; adjustable mechanism for moving the elevator; and means to sever the webbing.

37. In a machine of the character specified, an impregnating-tank; wringer-rolls arranged to act upon the webbing; a form; an elevator for carrying the webbing onto the form; adjustable mechanism for moving the elevator; a power-shaft; connections intermediate the elevator mechanism and said shaft; and an adjustable driving connection between the wringer-rolls and the shaft.

38. In combination with web-impregnating mechanism; a form; an adjustable web-presenting mechanism; and means for varying the speed of travel of the impregnating mechanism according to the variations of travel of the presenting mechanism.

39. In a machine of the character specified, the combination of web-impregnating mechanism; a series of forms; means for placing the impregnated web in mantle lengths upon said forms in succession; means for successively presenting said forms to web-placing means; and means for holding said forms against movement as the web is being placed thereon.

40. In a machine of the character specified, the combination of web-impregnating mechanism; an endless carrier; a series of forms supported thereby; means for placing the impregnated web in mantle lengths upon said forms in succession; means for advancing the forms one by one to the web-placing means; and means for temporarily holding that form upon which the web is being placed against movement.

41. In a machine of the character specified, the combination of an endless carrier; a series of forms depending therefrom; web-presenting mechanism; and means for embracing the forms and holding them in direct alinement with the web-presenting mechanism.

42. In a machine of the character specified, the combination of a drier; an endless carrier passing therethrough; a series of forms carried thereby; a support for the carrier without the drier; means for imparting a step-by-step movement to said support; means for passing a mantle length of web onto each form as it comes to rest adjacent to the outer support; means for constantly moving that portion of the carrier within the drier; and a slack-adjuster for the carrier.

43. In a machine of the character specified, the combination of a drier; an endless carrier passing therethrough; a series of pendulous forms supported by said carrier; a support for the carrier without the drier; a pocket-wheel engaging the forms as they pass about the support; and a curved rail acting in conjunction with the pocket-wheel to hold the forms in place.

44. In a machine of the character specified, the combination of a drier; an endless chain passing therethrough; a series of rods connected to said chain; a form carried by each rod; a sprocket-wheel located without the drier and about which the chain passes; a pocket-wheel located below the wheel and adapted to receive the rods; a curved rail bearing against the rods and serving to hold them in the pockets of the pocket-wheel; and means for imparting a step-by-step movement to the sprocket and pocket wheels.

45. In a machine of the character specified, the combination of a form, having substantially the shape of a finished mantle; means for placing webbing in mantle lengths thereon; and means for subjecting the webbing while thus held to a chemical solution.

46. In a machine of the character specified, the combination of a series of forms each of said forms having substantially the shape of a finished mantle; means for placing webbing in mantle lengths thereon; a cup or receptacle; and means for moving the parts relatively so as to subject the supported mantle length to the contents of the cup.

47. In a machine of the character specified, the combination of a series of forms each of said forms having substantially the shape of a finished mantle; means for placing webbing in mantle lengths thereon; a cup or receptacle; means for advancing the forms successively over the cup; and means to raise the cup so as to bring the mantle into contact with the contents thereof.

48. In a machine of the character specified, the combination of a form having substantially the shape of a finished mantle; means for placing impregnated webbing in mantle lengths thereon; and means for subjecting the mantle thus held to a "head solution."

49. In a machine of the character specified, the combination of an endless carrier; a series of forms carried thereby each of said forms having substantially the shape of a finished mantle; means for passing webbing in mantle lengths thereon; means for drying the webbing while thus supported; and means for successively withdrawing the mantles from the forms.

50. In a machine of the character specified, the combination of an endless carrier; a series of forms carried thereby; means for passing webbing in mantle lengths onto the forms; a drier through which the forms with the mantles thereon are passed; means for arresting the movement of the forms without the drier; and means for withdrawing the dried mantles from the forms while they are at rest.

51. In a machine of the character specified, the combination of an endless carrier; a series of forms carried thereby; means for passing webbing in mantle lengths thereon; a drier through which the forms thus charged are passed; means for arresting the movement of the forms without the drier; means for withdrawing the dried mantles from the forms; and means for registering the number of actuations of said withdrawing means.

52. In a machine of the character specified, the combination of an endless carrier; a series of vertically-disposed forms supported therefrom; means for stripping the dried mantles from said forms; a register; a pivoted actuating-arm for said register; and a roller carried upon a vertically-disposed pivot mounted in the outer end of the arm, said roller coming into contact with the mantles on the forms as the same are brought into line therewith, substantially as described.

53. In a machine of the character specified, the combination of a form; means for supplying the same with a mantle length of webbing; a drier; means for passing the charged form through the drier; a stripping mechanism; a pivoted platform arranged to receive the mantle from the stripping mechanism; a bed or table; and means for swinging the platform about its pivot and transferring the mantle to the table.

54. In a machine of the character specified, the combination of a form; means for placing a mantle length of webbing thereon; a drier; means for passing the form through the drier; a pair of jaws; means for closing the same upon the lower end of the mantle; and means for swinging the jaws to strip the mantle from the form.

55. In a machine of the character specified, the combination of a form; and a stripping mechanism therefor, said mechanism comprising a pair of arms each having a jaw upon its outer end, a gear meshing with a rack formed on each of the arms, a pinion rotating with the gear, a rack for actuating the pinion, means for shifting the rack, and means for swinging the arms downwardly after the jaws have been closed.

56. In a machine of the character specified, the combination of a form; a stripping mechanism, comprising a pair of arms each having a jaw at its outer end, racks formed on the inner ends of said arms, a rotatable barrel or sleeve serving to support said arms, a gear meshing with the racks on the arms, a pinion, a rack-bar mounted in the sleeve and meshing with the pinion, means to actuate the rack-bar, and means to rock the sleeve and to thereby depress the arms; a pivoted platform standing in line with the arms; a fixed bed; and means for rocking the platform toward and from the bed.

57. In a machine of the character specified, the combination of means for supplying impregnated webbing; a form; an elevator for carrying the webbing onto the form; means for raising and lowering the elevator; and means for temporarily locking the elevator in its lowermost position.

58. In a machine of the character specified, the combination of a form; means for continuously impregnating a web of material; and means for intermittently placing said web on the form.

59. In a machine of the character specified, the combination of a pendulous form having substantially the shape of a mantle; means for placing a mantle length of impregnated web upon said form; and means for drying the web while it remains at rest upon the form.

60. In a machine of the character specified, the combination of a form; means for drawing a mantle length of impregnated webbing over said form; and means for subjecting the lower end of the webbing to a head solution while the impregnating solution is still moist.

61. In a machine of the character specified, the combination of a pendulous form; means for drawing a mantle length of saturated webbing thereon; and means for drying the webbing while held in position upon the form, whereby the saturating solution may gravitate to a slight extent toward the lower or head end of the inverted mantle.

62. In a machine of the character specified, the combination of a pendulous form; means for drawing a mantle length of saturated webbing thereon; means for subjecting the lower or head end of the mantle to a head solution while the mantle is still moist; and means for drying the mantle as it is held upon the form.

63. In a machine of the character specified, the combination of a form arranged to hold a mantle; mechanism for withdrawing the mantle from the form; and a packer working in conjunction with said withdrawing mechanism.

In testimony whereof I have signed my name to this specification in the presence of two subscribing witnesses.

ERNEST D. ANDERSON.

Witnesses:
　WILLIAM C. MEYER,
　C. G. GREENLEAF.